(12) United States Patent
Sasaki et al.

(10) Patent No.: US 10,214,235 B2
(45) Date of Patent: Feb. 26, 2019

(54) POWER STEERING DEVICE AND POWER STEERING DEVICE CONTROL UNIT

(71) Applicant: HITACHI AUTOMOTIVE SYSTEMS, LTD., Hitachinaka-shi, Ibaraki (JP)

(72) Inventors: Mitsuo Sasaki, Hadano (JP); Takumi Hisazumi, Atsugi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 114 days.

(21) Appl. No.: 15/124,460

(22) PCT Filed: Jan. 14, 2015

(86) PCT No.: PCT/JP2015/050747
§ 371 (c)(1),
(2) Date: Sep. 8, 2016

(87) PCT Pub. No.: WO2015/141254
PCT Pub. Date: Sep. 24, 2015

(65) Prior Publication Data
US 2017/0015348 A1 Jan. 19, 2017

(30) Foreign Application Priority Data
Mar. 19, 2014 (JP) ................ 2014-056038

(51) Int. Cl.
*B62D 5/04* (2006.01)
*B62D 6/00* (2006.01)
(52) U.S. Cl.
CPC ............ *B62D 5/049* (2013.01); *B62D 5/046* (2013.01); *B62D 5/0484* (2013.01); *B62D 6/00* (2013.01)

(58) Field of Classification Search
CPC ...... B62D 5/049; B62D 5/046; B62D 5/0484; B62D 6/00
See application file for complete search history.

(56) References Cited

U.S. PATENT DOCUMENTS 6,041,884 A * 3/2000 Shimizu ................ B62D 1/166
180/443
7,559,405 B2 7/2009 Kumaido et al.
(Continued)

FOREIGN PATENT DOCUMENTS

JP 05-069851 A 3/1993
JP 07-112667 A 5/1995
(Continued)

*Primary Examiner* — Thomas G Black
*Assistant Examiner* — Sze-Hon Kong
(74) *Attorney, Agent, or Firm* — Foley & Lardner LLP

(57) ABSTRACT

Disclosed is a power steering device having at least two redundant steering torque sensor units, at least two redundant steering angel sensor units, at least two redundant motor position sensor units and a control unit configured to: in a normal state, perform steering assist control based on a steering torque detection signal of one of the steering torque sensor units, a steering angle detection signal of one of the steering angle sensor units and a motor position detection signal of one of the motor position sensor units; perform redundant monitoring on the steering torque sensor units, the steering angel sensor units and the motor position sensor units; and, upon detection of an abnormality in any sensor output signal by the redundant monitoring, switch the abnormal signal to an alternative signal.

17 Claims, 20 Drawing Sheets

(56) References Cited

U.S. PATENT DOCUMENTS

| | | | |
|---|---|---|---|
| 2002/0059021 A1* | 5/2002 | Nishizaki | B62D 5/003 701/41 |
| 2002/0195293 A1* | 12/2002 | Will | B62D 5/046 180/445 |
| 2003/0184246 A1* | 10/2003 | Sardar | B62D 5/0487 318/369 |
| 2007/0000717 A1* | 1/2007 | Kumaido | B62D 5/0481 180/446 |
| 2009/0133956 A1* | 5/2009 | Itoh | B62D 5/0403 180/446 |
| 2010/0082200 A1 | 4/2010 | Ura | |
| 2011/0270553 A1* | 11/2011 | Ausserlechner | G01R 15/202 702/64 |
| 2012/0303221 A1* | 11/2012 | Gunthner | B60R 16/02 701/45 |
| 2013/0253773 A1 | 9/2013 | Itamoto et al. | |
| 2014/0172236 A1* | 6/2014 | Nishikawa | B62D 5/003 701/42 |
| 2014/0201571 A1* | 7/2014 | Hosek | G06F 11/2257 714/26 |
| 2015/0226627 A1* | 8/2015 | Kuwahara | B62D 5/049 701/41 |
| 2015/0241523 A1* | 8/2015 | Scherr | G01R 33/0023 324/244 |
| 2015/0367881 A1* | 12/2015 | Tsunoda | B62D 5/0487 701/43 |
| 2016/0059886 A1* | 3/2016 | Tsunoda | B62D 5/0484 701/43 |
| 2016/0231142 A1* | 8/2016 | Kawano | G01D 5/24485 |

FOREIGN PATENT DOCUMENTS

| | | |
|---|---|---|
| JP | 07-329803 A | 12/1995 |
| JP | 09-315331 A | 12/1997 |
| JP | 2005-206070 A | 8/2005 |
| JP | 2006-282172 A | 10/2006 |
| JP | 2009-012511 A | 1/2009 |
| JP | 2010-076637 A | 4/2010 |
| JP | 2011-158389 A | 8/2011 |
| JP | 2011-230531 A | 11/2011 |
| JP | 2012-206674 A | 10/2012 |
| JP | 2013-172543 A | 9/2013 |
| WO | WO-2012/108525 A1 | 8/2012 |

\* cited by examiner

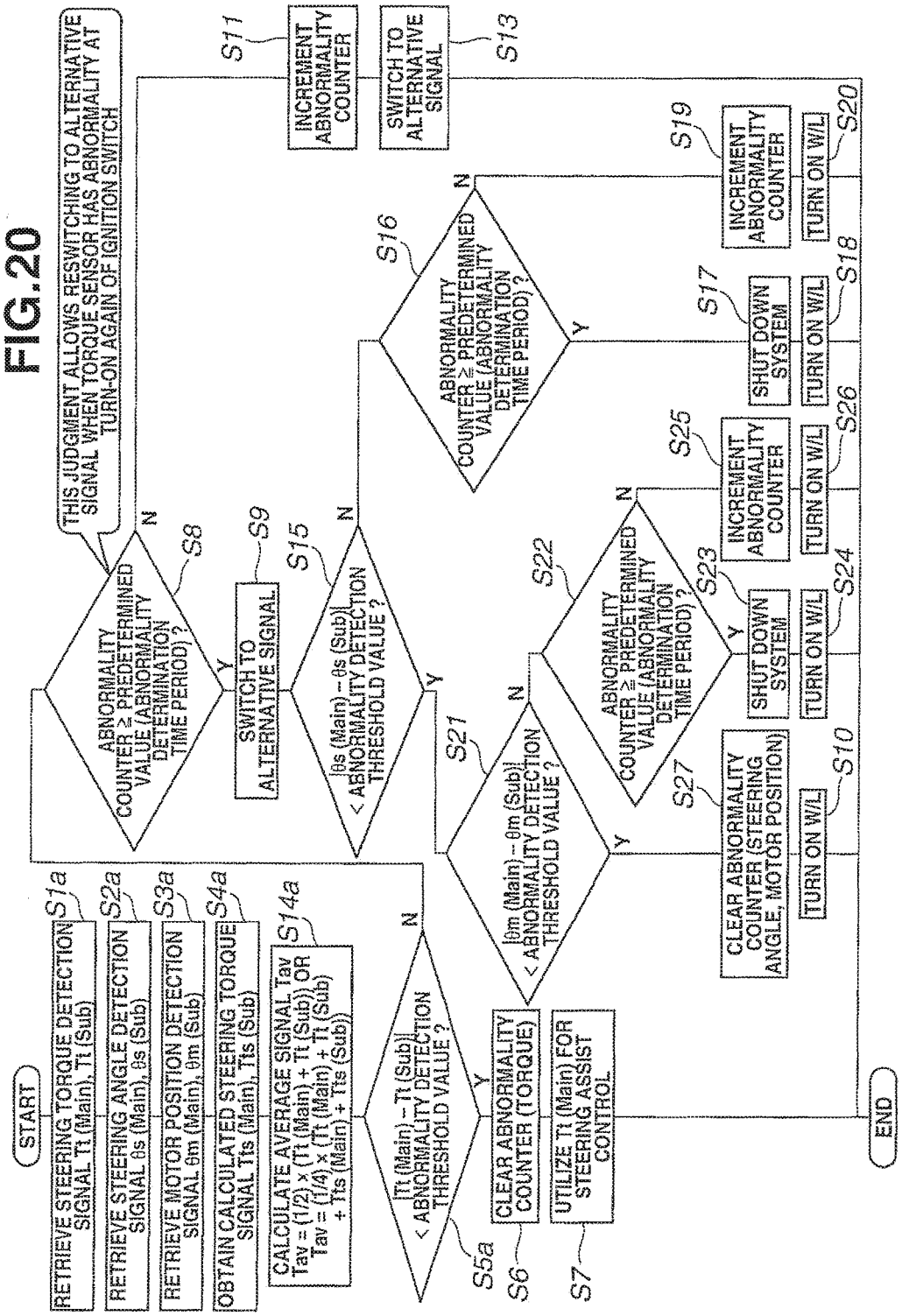

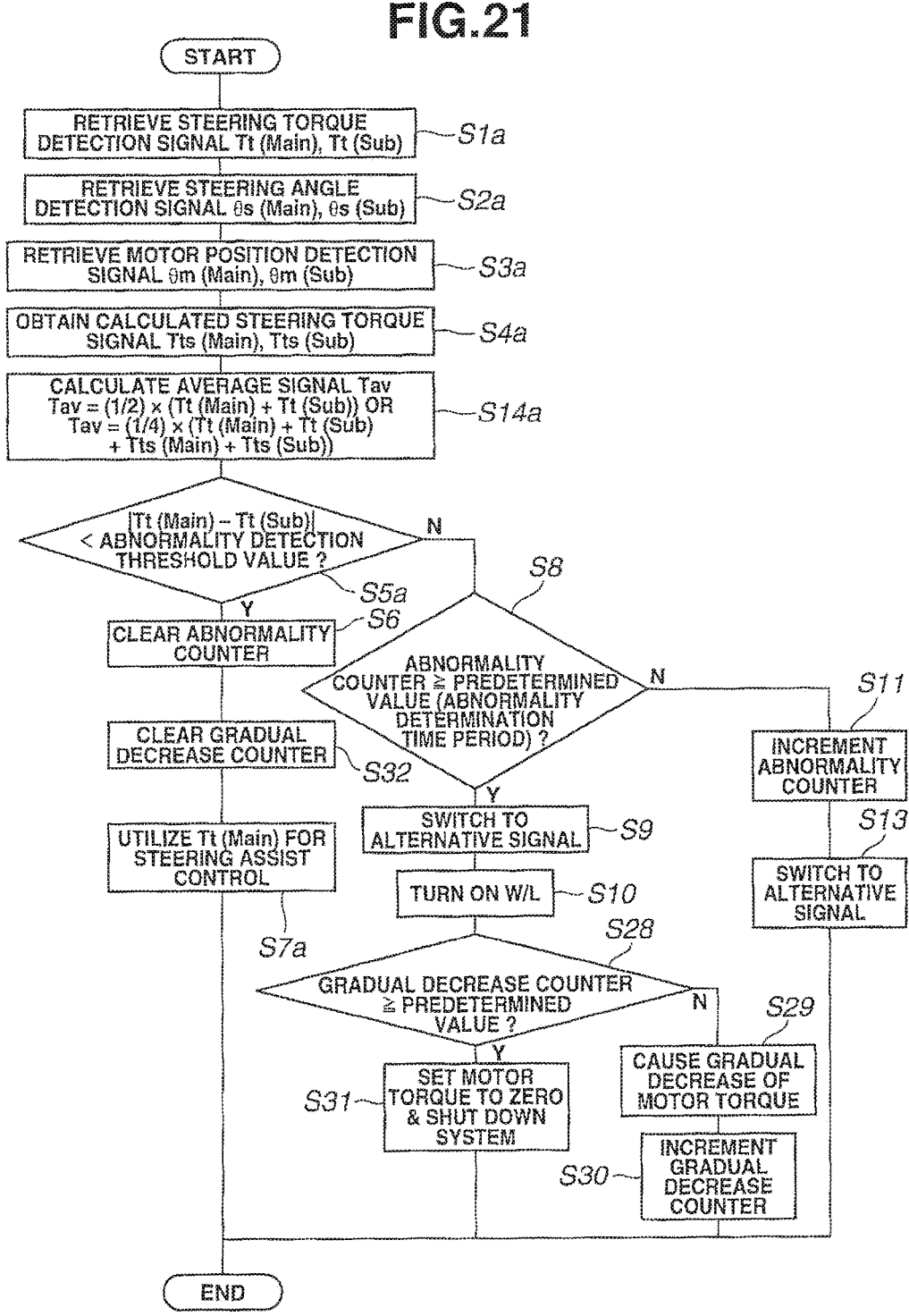

POWER STEERING DEVICE AND POWER STEERING DEVICE CONTROL UNIT

FIELD OF THE INVENTION

The present invention relates to a power steering device and a power steering device control unit.

BACKGROUND ART

With the recent widespread use of EPS devices, further improvement of product appeal is desired. It is particularly demanded to, in the event of a failure in an EPS device, preserve the steering assist function of the EPS device even for a limited time.

Patent Document 1 discloses a technique to preserve the steering assist function of the EPS device by, upon detection of an abnormality in a torque sensor, generating an alternative signal based on signals from upstream and downstream sides of a torsion bar, switching an output signal of the torque sensor to the alternative signal and continuing steering assist control operation according to the alternative signal.

PRIOR ART DOCUMENTS

Patent Document

Patent Document 1: Japanese Laid-Open Patent Publication No. 2005-206070

SUMMARY OF THE INVENTION

As mentioned above, it has been a problem for the power steering device and its control unit to preserve the steering assist function in the event of an abnormality in the sensor output signal.

The present invention has been made in view of the above problem.

In accordance with one aspect of the present invention, there is provided a power steering device having at least two redundant steering torque sensor units, at least two redundant steering angel sensor units, at least two redundant motor position sensor units and a control unit configured to: in a normal state, perform steering assist control based on a steering torque detection signal of one of the steering torque sensor units, a steering angle detection signal of one of the steering angle sensor units and a motor position detection signal of one of the motor position sensor units; perform redundant monitoring between on steering torque sensor units, the steering angel sensor units and the motor position sensor units; and, upon detection of an abnormality in any sensor output signal by the redundant monitoring, switches the abnormal signal to an alternative signal.

It is therefore possible for the power steering device and power steering device control unit according to the present invention to preserve the steering assist function even in the event of the abnormality in the sensor output signal.

BRIEF DESCRIPTION OF DRAWINGS

FIG. 20 is a flowchart of an abnormal signal switching process of the power steering device according to the seventh embodiment of the present invention.

FIG. 21 is a flowchart of an abnormal signal switching process of a power steering device according to an eighth embodiment of the present invention.

DESCRIPTION OF EMBODIMENTS

Hereinafter, power steering devices and their control units according to first to eighth embodiments of the present invention will be described in detail below with reference to FIGS. 1 to 21.

[First Embodiment]

Figure 1:
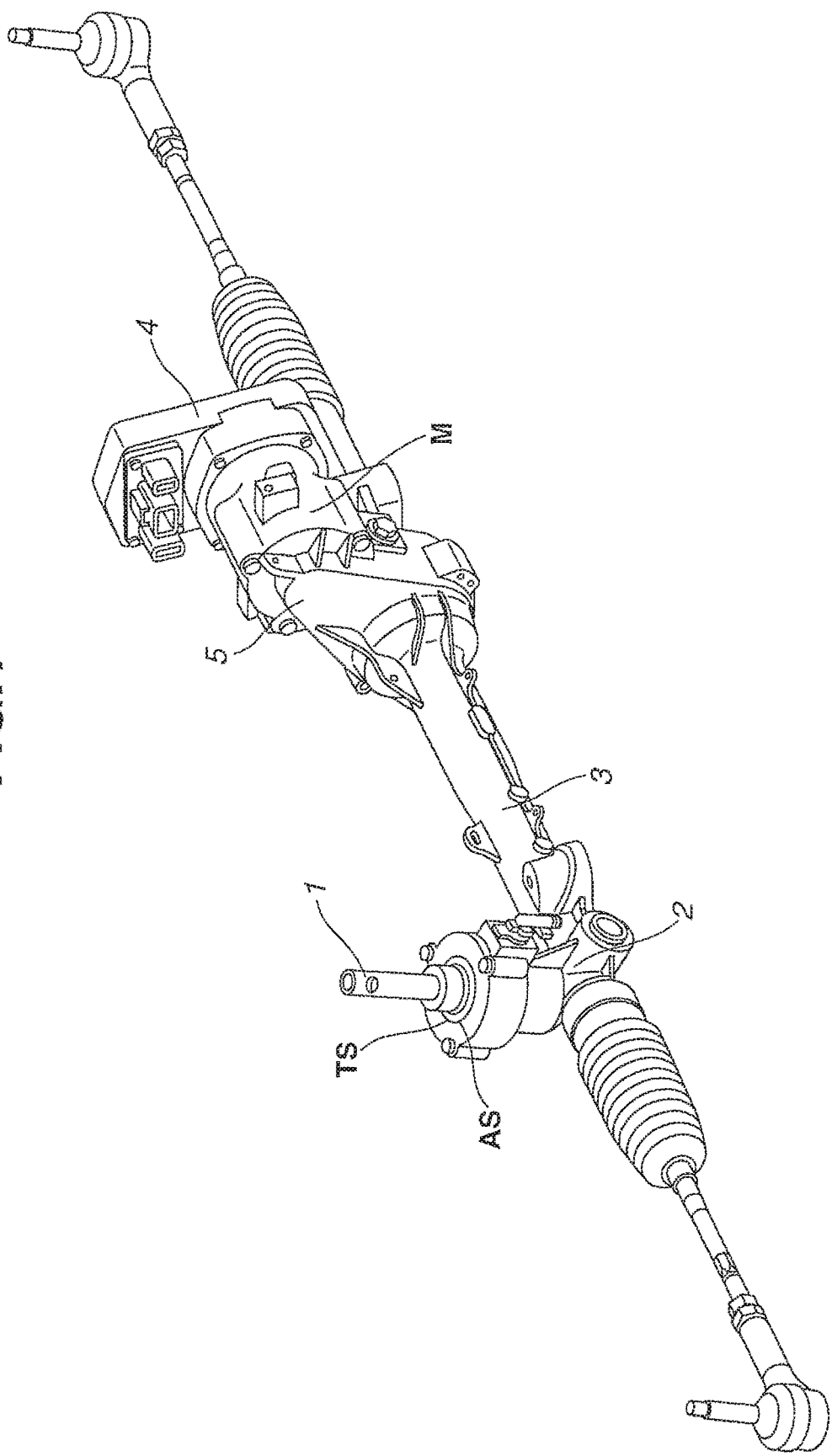
FIG. 1 is a schematic view of a power steering device according to a first embodiment of the present invention.

FIG. 1 is a schematic view of the power steering device according to the first embodiment of the present invention.

As shown in FIG. 1, the power steering device has a basic steering system including a steering wheel (not shown), a steering shaft 1, a pinion shaft 2 and a rack shaft 3 so as to, when the steering wheel is turned by a vehicle driver, transmit a steering torque of the steering wheel to the pinion shaft 2 via the steering shaft 1, convert the rotation of the pinion shaft 2 to linear movement of the rack shaft 3 and thereby steer left and right steerable vehicle wheels (not shown) connected to both ends of the rack shaft 3. Namely, the rack shaft 3 has rack teeth engaged with the pinion shaft 2 such that the engagement of the rack teeth and the pinion shaft constitutes a conversion mechanism to convert the rotation of the steering shaft 1 to steering operation.

A steering torque sensor TS (such as resolver) is disposed on a housing of the pinion shaft 2 to detect a steering angle of the steering wheel. A motor position sensor 6 (such as resolver or IC) is disposed to detect a rotor rotational position of an electric motor M. Based on output signals of the steering torque sensor TS and the motor position sensor 6 and vehicle speed information, the electric motor M is driven and controlled by a motor control circuit module (not specifically shown) of the control unit (hereinafter also referred to as "ECU") so as to apply a steering assist torque from the electric motor M to the rack shaft 3 via a reduction gear 5.

As the reduction gear 5 is disposed on an output shaft of the electric motor M, the torque of the electric motor M is reduced by the reduction gear 5 and converted to the linear movement of the rack shaft 3.

Herein, the steering shaft 1 has two axially separable shaft members: an input shaft member on the steering wheel side and an output shaft on the rack shaft 3 side. The input and output shaft members are coaxially coupled together via a torsion bar (not shown) and are rotatable relative to each other by torsion of the torsion bar. In the first embodiment, the steering torque sensor TS has each sensor unit constituted by first and second torque sensor elements to detect a relative rotational angle between the input shaft member and the output shaft member, calculate the amount of torsion of the torsion bar based on output signals of the first and second angle torque elements and determine the steering torque according to the calculated torsion amount.

A steering angle sensor AS (such as MR element or IC element) is also disposed on the torsion bar.

Figure 2:
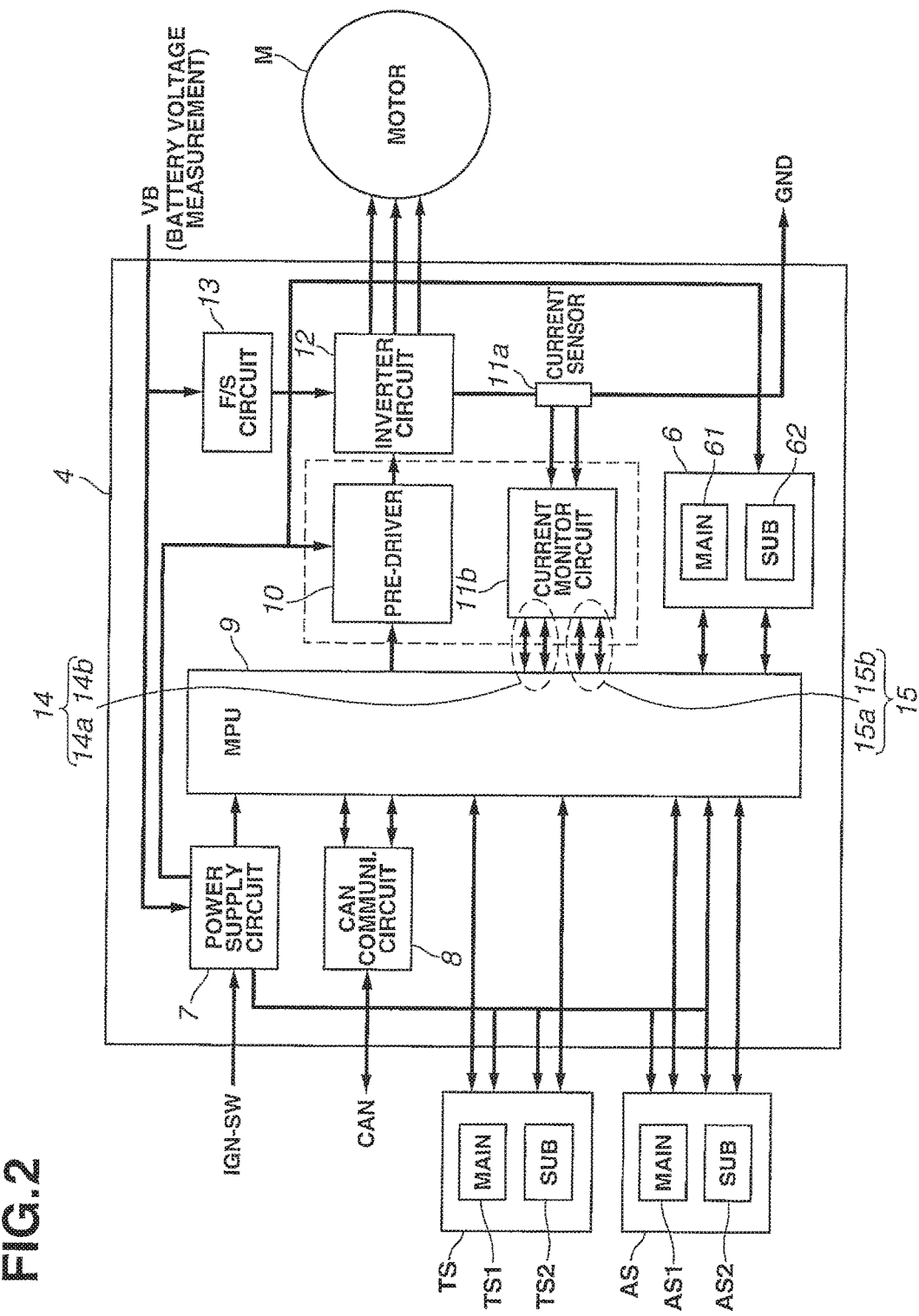
FIG. 2 is a block diagram of an electric system of the power steering device according to the first embodiment of the present invention.
Figure 3:
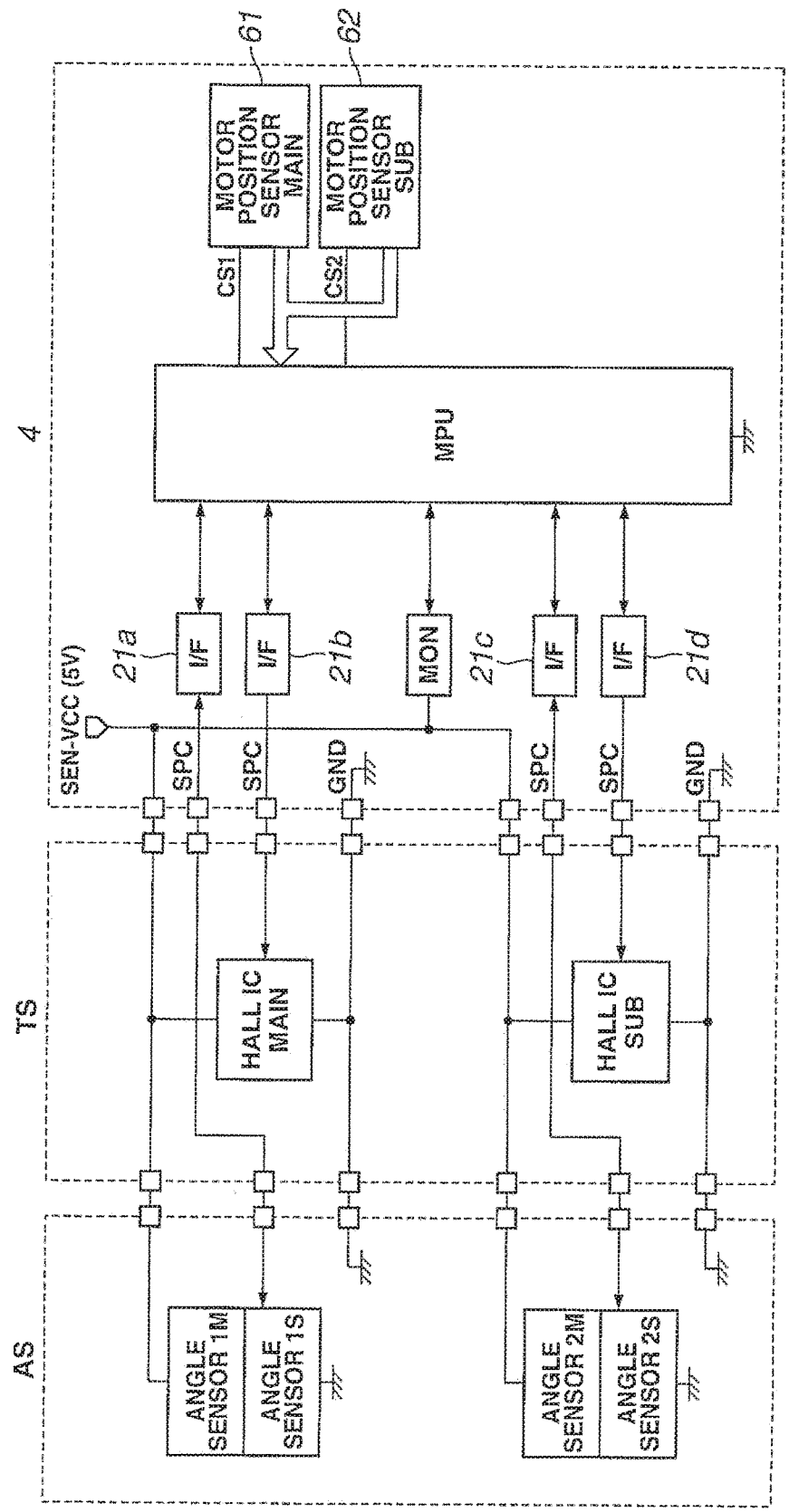
FIG. 3 is a schematic diagram showing inputs and outputs of a steering torque sensor and a steering angle sensor of the power steering device according to the first embodiment of the present invention.

FIG. 2 is a block diagram of an electric system of the power steering device. FIG. 3 is a schematic diagram showing inputs and outputs of the steering torque sensor TS, the steering angle sensor AS and the motor position sensor 6.

As shown in FIGS. 2 and 3, two main and sub steering torque sensor units TS1 and TS2, two main and sub steering angle sensor units AS1 and AS2 and two main and sub motor position sensor units 61 and 62 are arranged to detect the steering torque, the steering angle and the motor position. Steering torque detection signals Tt(Main) and Tt(Sub), steering angle detection signals θs(Main) and θs(Sub) and motor position detection signals θm(Main) and θm(Sub) are outputted from the steering torque sensor units TS1 and TS2, the steering angle sensor units AS1 and AS2 and the motor position sensor units 61 and 62 to torque signal receiver 21b and 21d, steering angle signal receivers 21a and 21c and motor position signal receivers (not specifically shown) of the ECU 4, respectively.

A power supply circuit 7 is provided as a power source to supply power to the sensors, MPU 9, ICs and the like. A CAN communication circuit 8 is provided to perform data/information communication with the vehicle. The MPU 9 is configured to perform various processing for EPS assist control, motor current control, functional element abnormality detection, safe mode transition etc. A fail-safe circuit 13 is provided to, when the MPU 9 detects any abnormality and decides on the necessity for system shutdown, perform a motor current source shutdown function according to a command from the MPU 9.

A drive circuit 10 is provided to drive an inverter circuit 12 according to a command from the MPU 9. The inverter circuit 12 is equipped with a driver element and driven according to a command from the drive circuit 10. By the current flow from the inverter circuit 12, the electric motor M is driven to output the motor torque for steering assist. A current sensor 11a is provided as a current detection element to detect the current at the downstream side of the inverter circuit 12. A current monitor circuit 11b is arranged to monitor whether the motor command current is supplied as targeted to ensure the torque of the electric motor M required for steering assist control.

For control of the motor, main and sub current detection circuits 14a and 14b are provided to detect the current after high-response filtering. And also, main and sub current detection circuits 15a and 15b are provided to detect the average current after low-response filtering.

Figure 4:
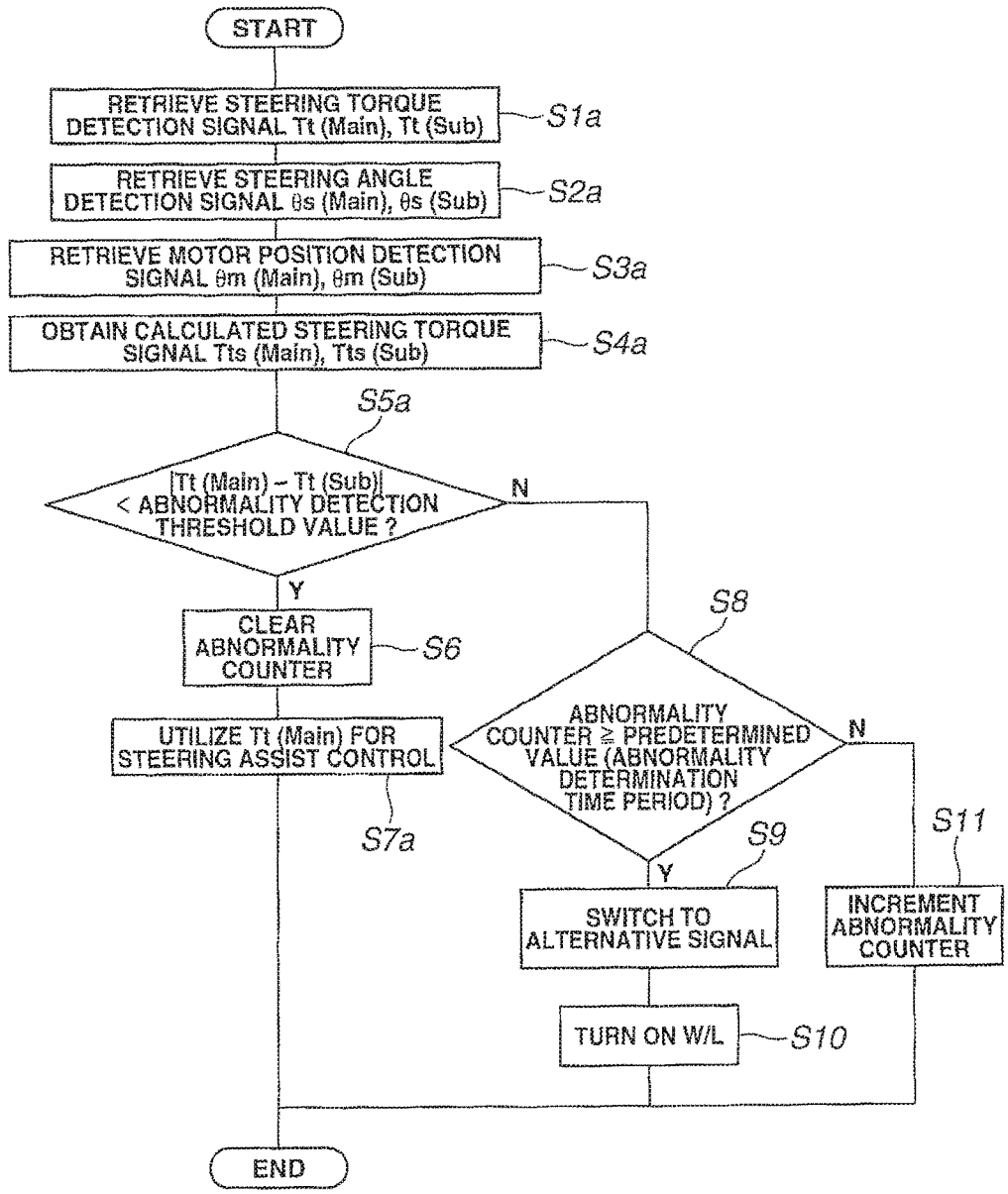
FIG. 4 is a flowchart of an abnormal signal switching process of the power steering device according to the first embodiment of the present invention.
Figure 5:
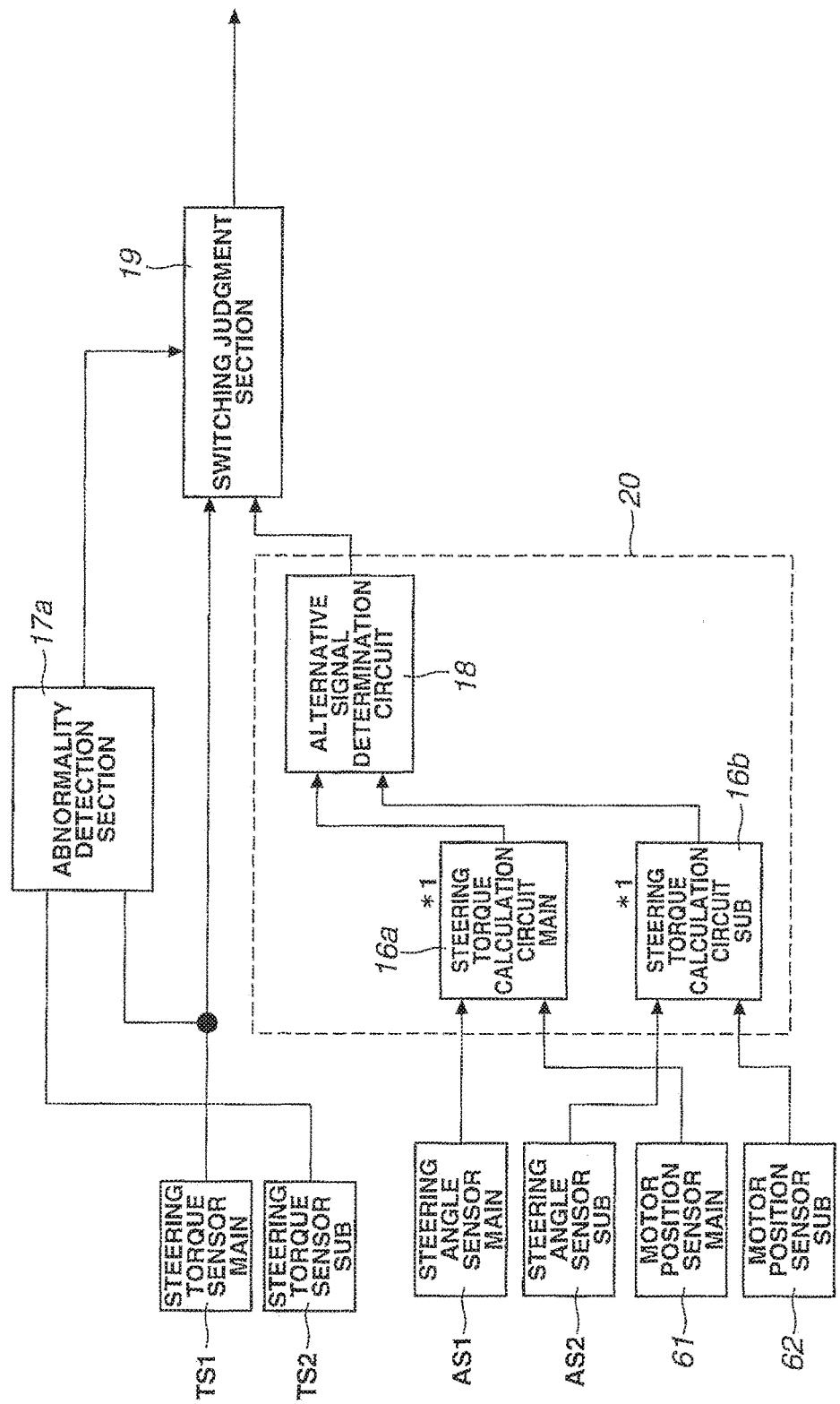
FIG. 5 is a control block diagram for the abnormal signal switching process of the power steering device according to the first embodiment of the present invention.
Figure 6:
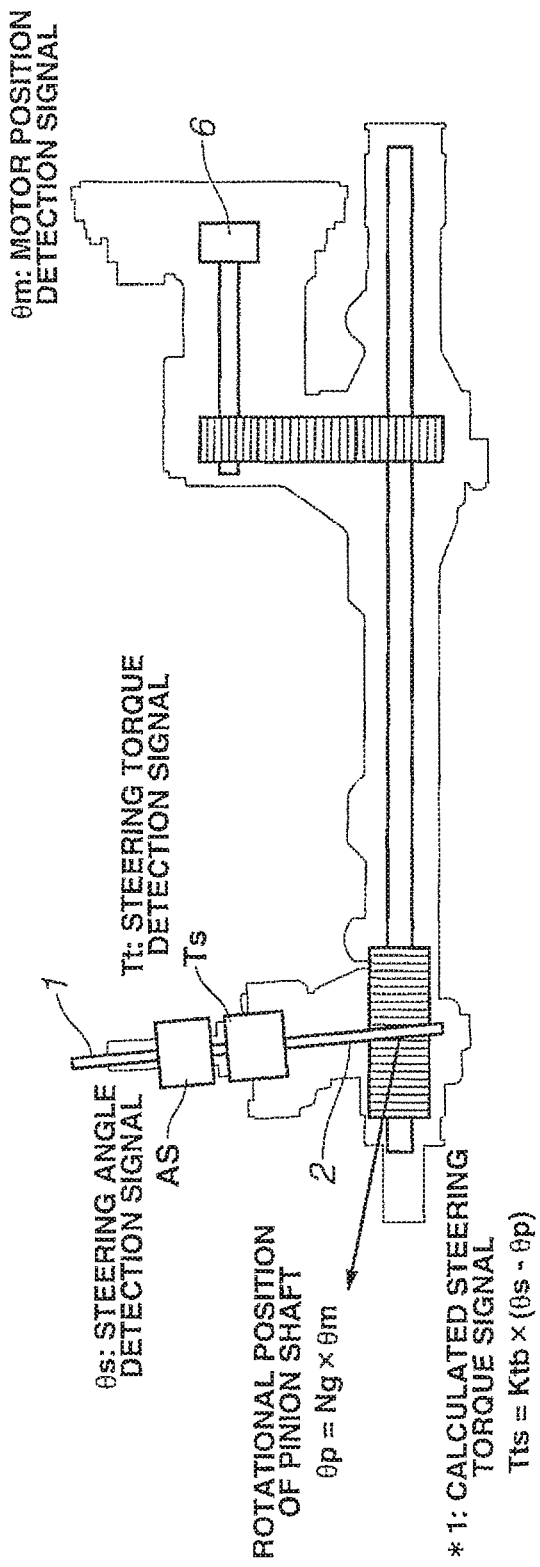
FIG. 6 is a schematic view showing an example of calculation of an operational steering torque signal (as an alternative signal) in the power steering device according to the first embodiment of the present invention.

Next, an abnormal signal switching process executed by the ECU 4 according to the first embodiment will be explained below with reference to FIGS. 4 to 6. FIG. 4 is a flowchart of the abnormal signal switching process. FIG. 5 is a control block diagram of the control unit. FIG. 6 is a schematic view showing an example of calculation of an operational steering torque signal.

At step S1a, the steering torque detection signals Tt(Main) and Tt(Sub) are retrieved from the main and sub steering torque sensor units TS1 and TS2, respectively. At step S2a, the steering angle detection signals θs(Main) and θs(Sub) are retrieved from the main and sub steering angle sensor units AS1 and AS2, respectively. At step S3a, the motor position detection signals θm(Main) and θm(Sub) are retrieved from the main and sub motor position sensor units 61 and 62, respectively.

At step S4a, a calculated steering torque signal (alternative signal) Tts(Main) is obtained by a first steering torque calculation circuit 16a of an alternative signal calculation section 20 based on the steering angle detection signal θs(Main), the motor position detection signal θm(Main), the torsional rigidity Ktb of the torsion bar and the reduction ratio Ng between the pinion shaft 2 and the motor shaft.

A method of calculation of the calculated steering torque signal (alternative signal) Tts(Main) will be explained below with reference to FIG. 6. In the first embodiment, the calculated steering torque signal (alternative signal) Tts(Main) is obtained by multiplying the relative angle between upstream and downstream sides of the torsion bar by the torsional rigidity Ktb of the torsion bar. The steering angle detection signal θs(Main) is used as the angle of the upstream side of the torsion bar. The angle of the downstream side of the torsion bar (i.e. the angular position of the pinion shaft 2) is determined by multiplying the motor position detection signal θm(Main) by the reduction ratio Ng between the pinion shaft 2 and the motor shaft. Namely, the calculated steering torque signal Tts is given by the following equation (1).

$$Tts = Ktb \times (\theta s - \theta p) \quad (1)$$

Next, a calculated steering torque signal (alternative signal) Tts(Sub) is obtained by a second steering torque calculation circuit 16*b* of the alternative signal calculation section 20 based on the steering angle detection signal θs(Sub), the motor position detection signal θm(Sub), the torsional rigidity Ktb of the torsion bar and the reduction ratio Ng between the pinion shaft 2 and the motor shaft.

A method of calculation of the calculated steering torque signal (alternative signal) Tts(Sub) is similar to that of the calculated steering torque signal (alternative signal) Tts (Main).

The calculated steering torque signal Tts(Main) is determined as the alternative signal by an alternative signal determination circuit 18 in the first embodiment.

At step S5*a*, it is judged by an abnormality detection section 17*a* whether the difference |Tt(Main)−Tt(Sub)| between the two steering torque detection signals is smaller than an abnormality detection threshold value. When the difference |Tt(Main)−Tt(Sub)| between the two steering torque detection signals is judged as being smaller than the abnormality detection threshold value, the process goes to step S6. At step S6, the abnormality counter is cleared by the abnormality detection section. At step S7*a*, the steering torque detection signal Tt(Main) is set as the signal for steering assist control by a switching judgment section 19. After that, the process ends the current control cycle.

When the difference |Tt(Main)−Tt(Sub)| between the two steering torque detection signals is judged at step S5*a* as being greater than or equal to the abnormality detection threshold value, the process goes to step S8. At step S8, it is judged by the switching judgment section 19 whether the abnormality counter is greater than or equal to a predetermined value (abnormality determination time period). When the abnormality counter is judged as being greater than or equal to the predetermined value, the process goes to step S9. At step S9, the alternative signal is selected and set as the signal for steering assist control by the switching judgment section 19. At step S10, a warning lamp is turned on so as to give a warning to the vehicle driver.

When the abnormality counter is judged at step S8 as being smaller than the predetermined value, the process goes to step S11. At step S11, the abnormality counter is incremented by the abnormality detection section. Herein, the abnormality counter is incremented every control cycle when the condition in which the difference |Tt(Main)−Tt(Sub)| between the two steering torque detection signals is greater than or equal to the abnormality detection threshold value continues for the abnormality determination time period.

As explained above, the power steering device of the first embodiment is adapted to obtain the calculated steering torque signal (alternative signal) Tts(Main), Tts(Sub) using the steering angle detection signal θs(Main), θs(Sub) and the motor position detection signal θm(Main), θm(Sub) and, in the event of an abnormality in at least one of the steering torque detection signals Tt(Main) and Tt(Sub), utilize the calculated steering torque signal for steering assist control in place of such an abnormal detection signal. Accordingly, it is possible to continue steering assist control operation based on the calculated steering torque signal (alternative signal) Tts(Main), Tts(Sub) and thereby possible to reduce the steering load of the vehicle driver. It is also possible to decrease fluctuations in steering assist force caused due to the low accuracy of the alternative signal.

Furthermore, both of the steering torque detection signals Tt(Main) and Tt(Sub) are outputted as torque signals of the steering shaft. It is thus possible to easily compare these signals and enable early and accurate detection of the abnormality.

[Second Embodiment]

Although the first embodiment is characterized by the generation of the alternative signal upon detection of the abnormality in the steering torque detection signal Tt(Main), Tt(Sub) of the steering torque sensor unit TS1, TS2, the second embodiment is characterized by the generation of an alternative signal upon detection of an abnormality in the steering angle detection signal θs(Main), θs(Sub) of the steering angle sensor unit AS1, AS2.

Figure 7:
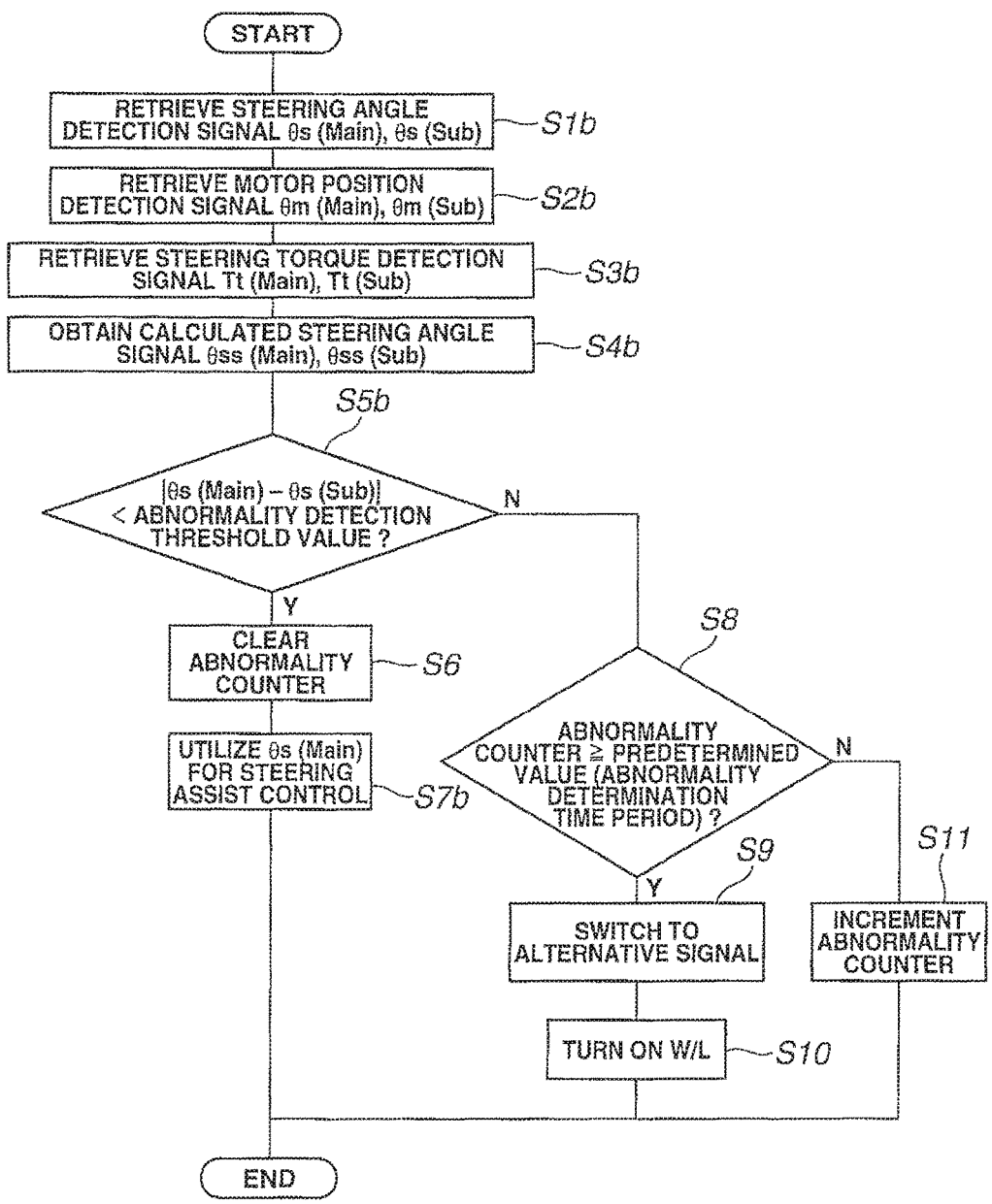
FIG. 7 is a flowchart of an abnormal signal switching process of a power steering device according to a second embodiment of the present invention.
Figure 8:
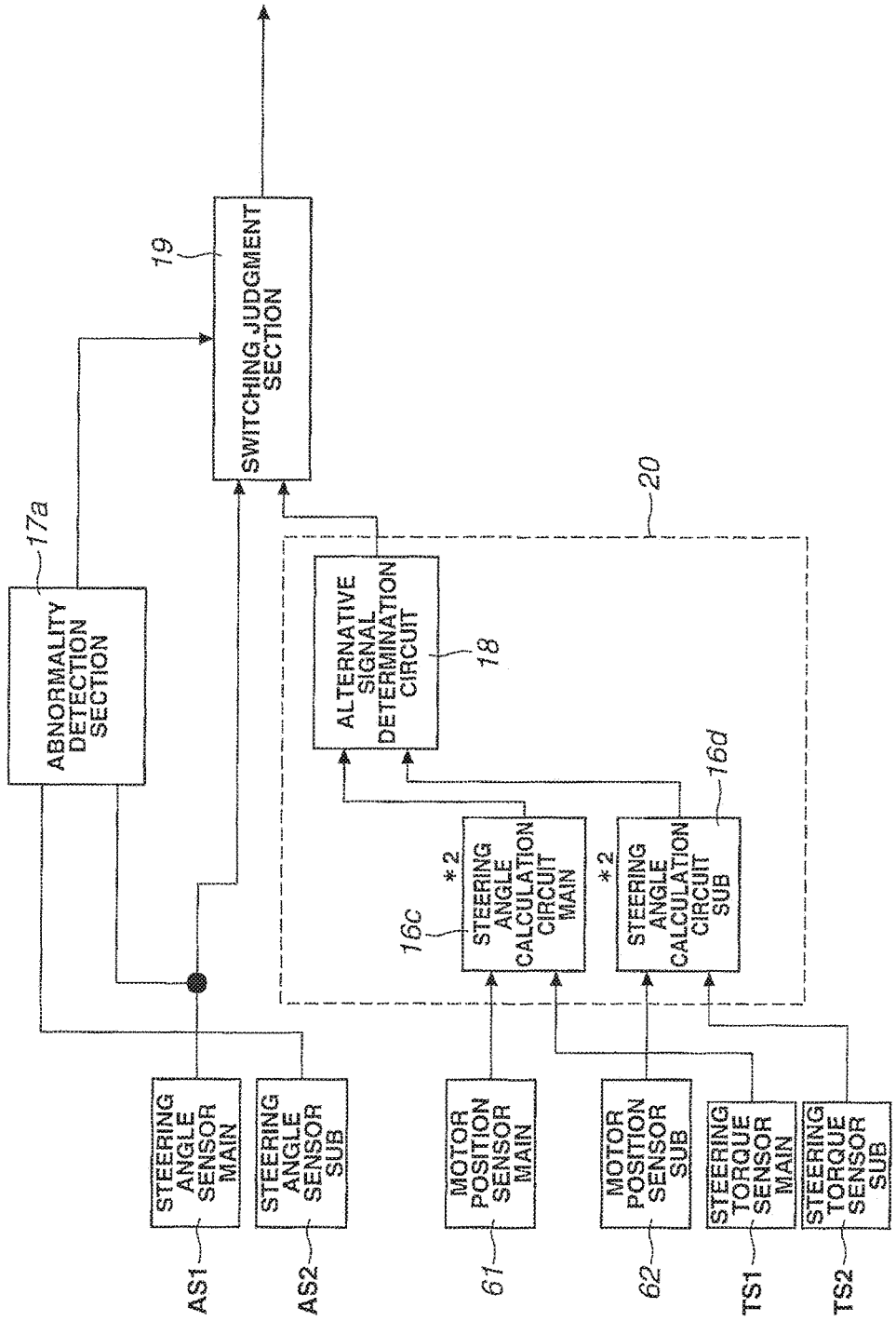
FIG. 8 is a control block diagram for the abnormal signal switching process of the power steering device according to the second embodiment of the present invention.
Figure 9:
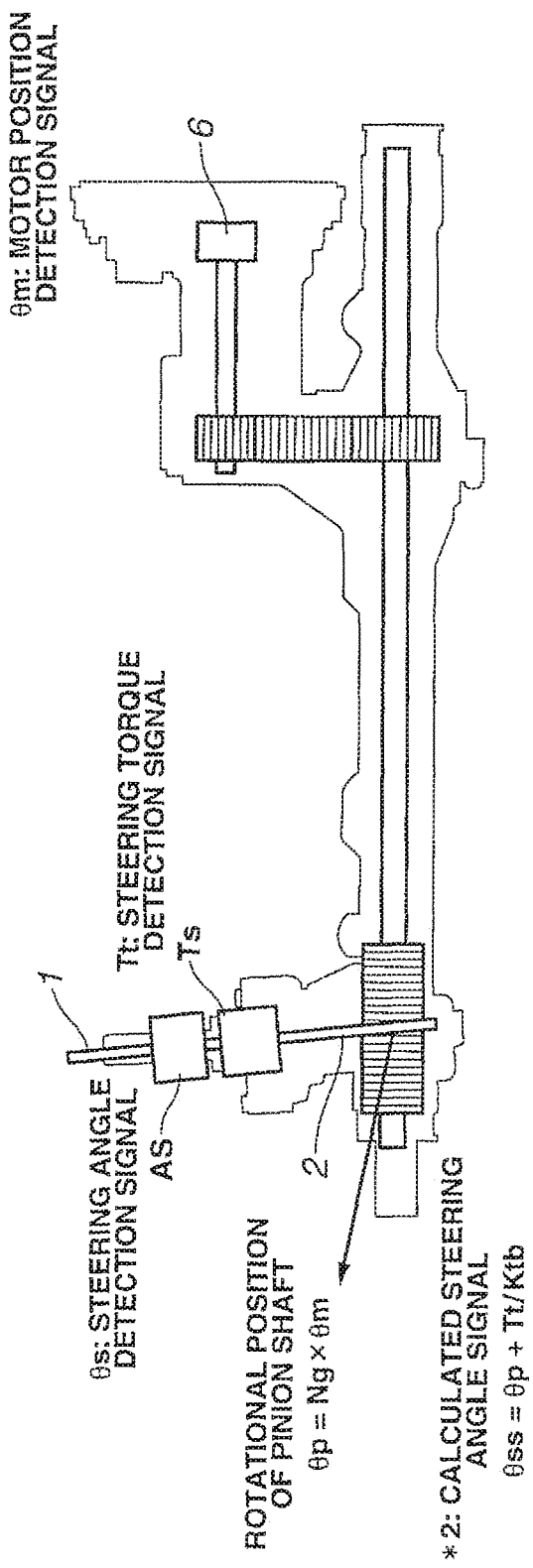
FIG. 9 is a schematic view showing an example of calculation of an operational steering angle signal (as an alternative signal) in the power steering device according to the second embodiment of the present invention.

The power steering device according to the second embodiment will be explained below with reference to FIGS. 7 to 9. FIG. 7 is a flowchart of an abnormal signal switching process. FIG. 8 is a control block diagram for detection of the abnormality in the steering angle detection signal. FIG. 9 is a schematic view showing an example of calculation of an operational steering angle signal.

As shown in FIG. 7, the processing of steps S6 and S8 to S11 of the second embodiment is the same as that of the first embodiment. Hence, explanation of the same processing of the second embodiment as that of the first embodiment will be omitted herefrom; and the following explanation will be focused only on the difference of the second embodiment from the first embodiment.

At steps S1*b* to S3*b*, the steering angle detection signals θs(Main) and θs(Sub), the motor position detection signals θm(Main) and θm(Sub) and the steering torque detection signals Tt(Main) and Tt(Sub) are retrieved.

In the second embodiment, the alternative signal is calculated as an alternative to the steering angle detection signal θs(Main), θs(Sub). More specifically, calculated steering angle signals (alternative signal) θss(Main) and θss(Sub) are obtained by first and second steering angle calculation circuits 16*c* and 16*d* of the alternative signal calculation section 20; and the calculated steering angle signal θss(Main) is outputted as the alternative signal by the alternative signal determination circuit 18.

At step S4*b*, the calculated steering angle signal (alternative signal) θss(Main) is obtained by the first steering angle calculation circuit 16*c* based on the steering torque detection signal Tt(Main), the motor position detection signal θm(Main), the torsional rigidity Ktb of the torsion bar and the reduction ratio Ng between the pillion shaft 2 and the motor shaft.

A method of calculation of the calculated steering angle signal (alternative signal) θss(Main) will be explained below with reference to FIG. 9.

The rotational position θp of the pinion shaft 2 is determined by multiplying the motor position detection signal θm by the reduction ratio Ng between the pinion shaft 2 and the motor shaft. Further, the torsion angle T/Ktb of the torsion bar is determined by dividing the steering torque detection signal Tt by the torsional rigidity Ktb of the torsion bar. There arises a difference between the steering angle and the rotational angle θp of the pinion shaft 2 in an amount corresponding to the amount of torsion of the torsion bar. The calculated steering angle signal (alternative signal) θss(Main) is thus obtained by adding the torsion angle T/Ktb of the torsion bar to the rotational angle θp of the pinion shaft 2 as indicated by the following equation (2).

$$\theta ss = \theta p + T/Ktb \qquad (2)$$

In the case where the steering angle sensor AS is located on the steerable wheel side with respect to the torsion bar, the calculated steering angle signal θss is equal to the rotational angle θp of the pinion shaft 2. There is no need to consider the torsion angle T/Ktb of the torsion bar.

Next, the calculated steering angle signal (alternative signal) θss(Sub) is obtained by the second steering angle calculation circuit 16d based on the steering torque detection signal Tt(Sub), the motor position detection signal θm(Sub), the torsional rigidity Ktb of the torsion bar and the reduction ratio Ng between the pinion shaft 2 and the motor shaft.

A method of calculation of the calculated steering angle signal (alternative signal) θss(Sub) is similar to that of the calculated steering angle signal θss(Main).

At step S5b, it is judged by an abnormality detection section 17b whether the difference |θs(Main)−θs(Sub)| between the two steering angle detection signals is smaller than an abnormality detection threshold value. When the difference |θs(Main)−θs(Sub)| between the two steering angle detection signals is judged as being smaller than the abnormality detection threshold value, the process goes to step S6. At step S6, the abnormality counter is cleared by the abnormality detection section. At step S7b, the steering angle detection signal θs(Main) is set as the signal for steering assist control by the switching judgment section 19. After that, the process ends the current control cycle.

As explained above, it is possible according to the second embodiment to obtain the same effects as according to the first embodiment.

Further, both of the steering angle detection signals θs(Main) and θs(Sub) are outputted as angular position signals of the steering shaft. It is thus possible for the abnormality detection section 17b to easily compare these signals and achieve early and accurate detection of the abnormality.

In the case where the steering angle sensor unit AS1, AS2 is located on the steering wheel side with respect to the torsion bar, there arises a difference between the steering angle and the motor position angle in an amount corresponding to the amount of torsion of the torsion bar. It is thus possible for the first, second steering angle calculation circuit 16c, 16d to obtain the calculated steering angle signal (alternative signal) θss(Main), θss(Sub) with higher accuracy by correcting the motor position angle by an amount of such a difference.

Moreover, both of the steering angle and the motor position angle are angular position information. In the case where the steering angle sensor unit AS1, AS2 is located on the steerable wheel side with respect to the torsion bar, the calculated steering angle signal (alternative signal) θss(Main), θss(Sub) is obtained by correcting the motor position detection signal θm(Main), θm(Sub) by an amount corresponding to the reduction ratio of the reduction gear 5. It is thus possible to obtain the calculated steering angle signal (alternative signal) θss(Main), θss(Sub) with high accuracy.

[Third Embodiment]

The third embodiment is characterized by the generation of an alternative signal upon detection of an abnormality in the motor position detection signal θm(Main), θm(Sub) of the motor position sensor 61, 62.

Figure 10:
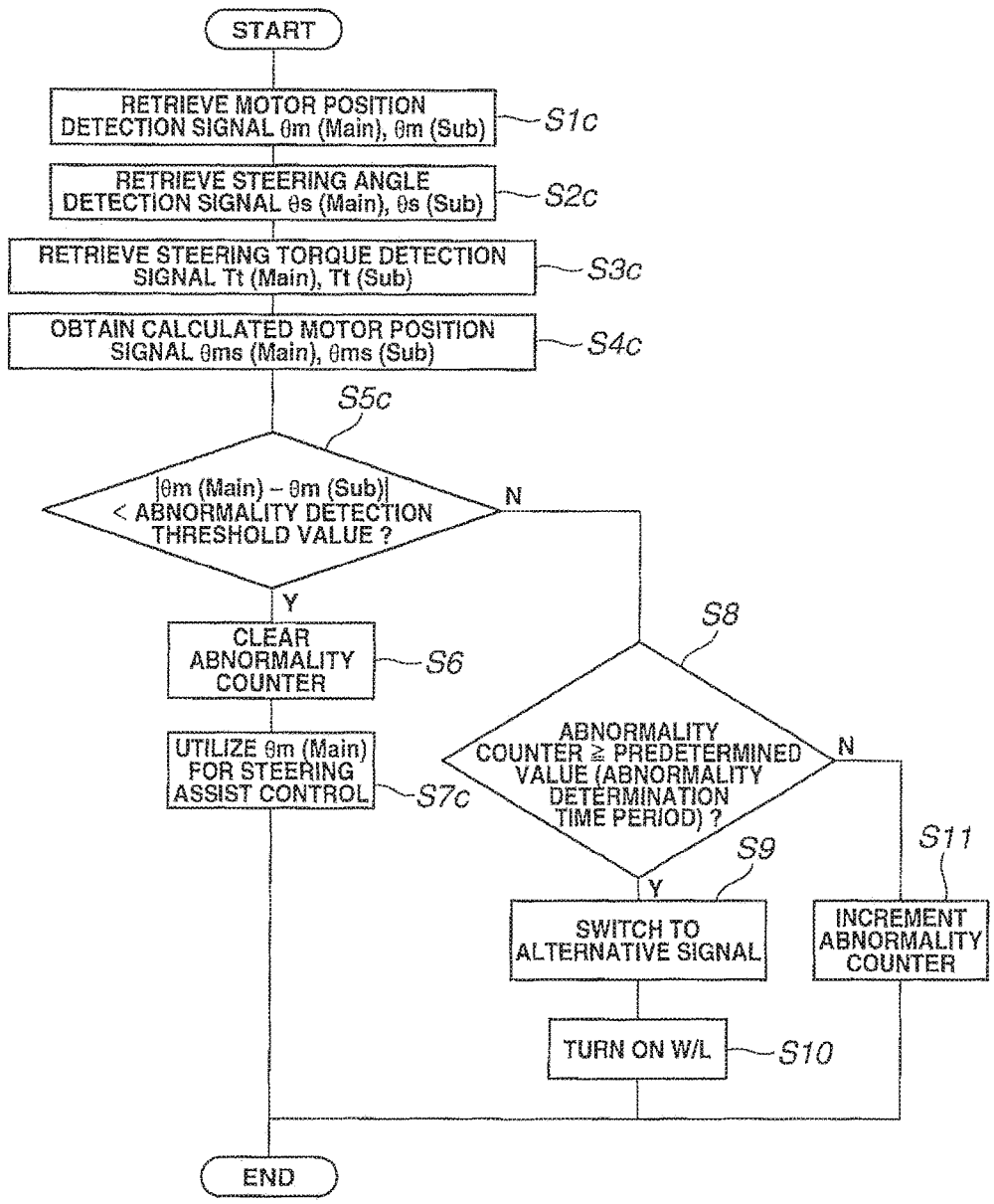
FIG. 10 is a flowchart of an abnormal signal switching process of a power steering device according to a third embodiment of the present invention.
Figure 11:
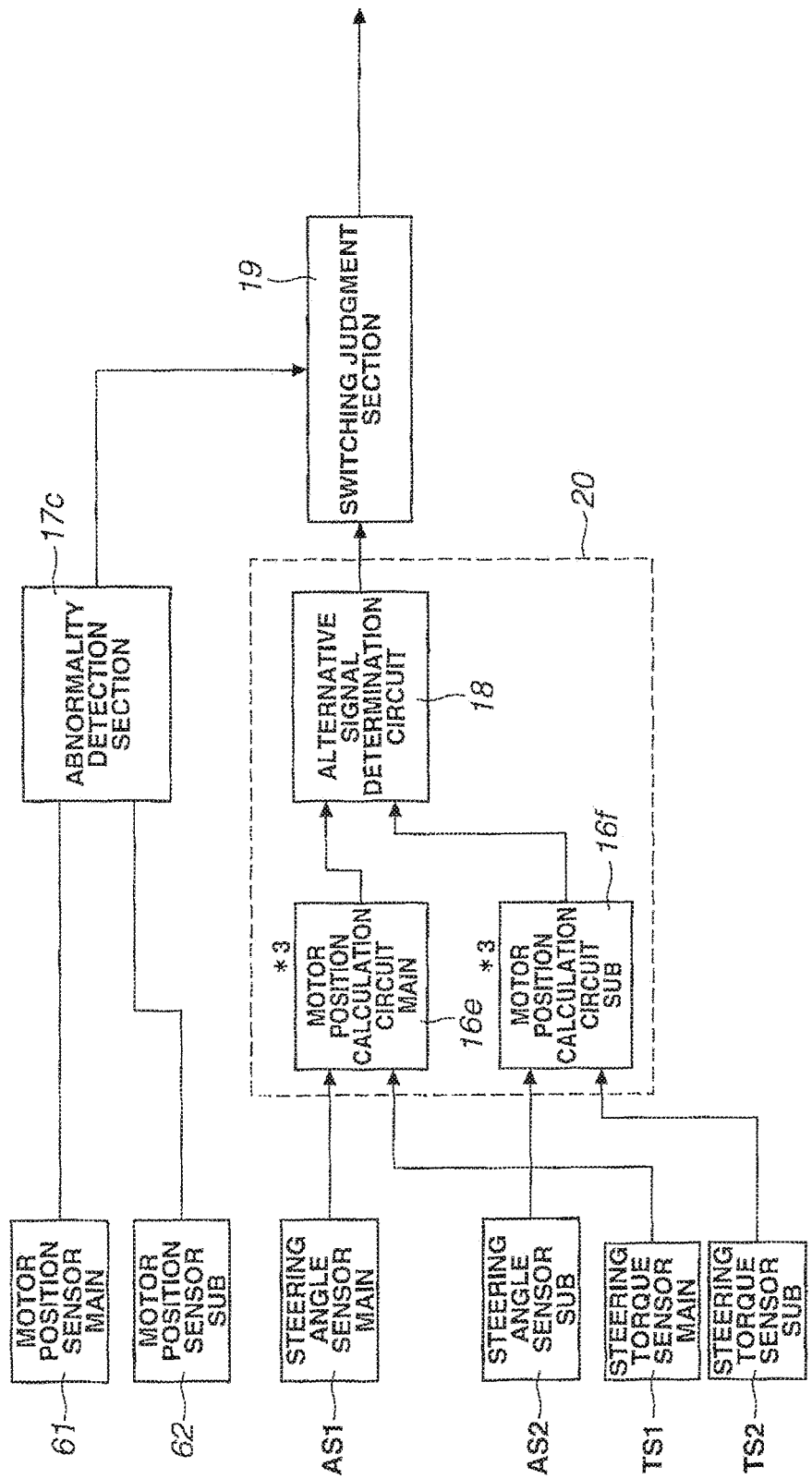
FIG. 11 is a control block diagram for the abnormal signal switching process of the power steering device according to the third embodiment of the present invention.
Figure 12:
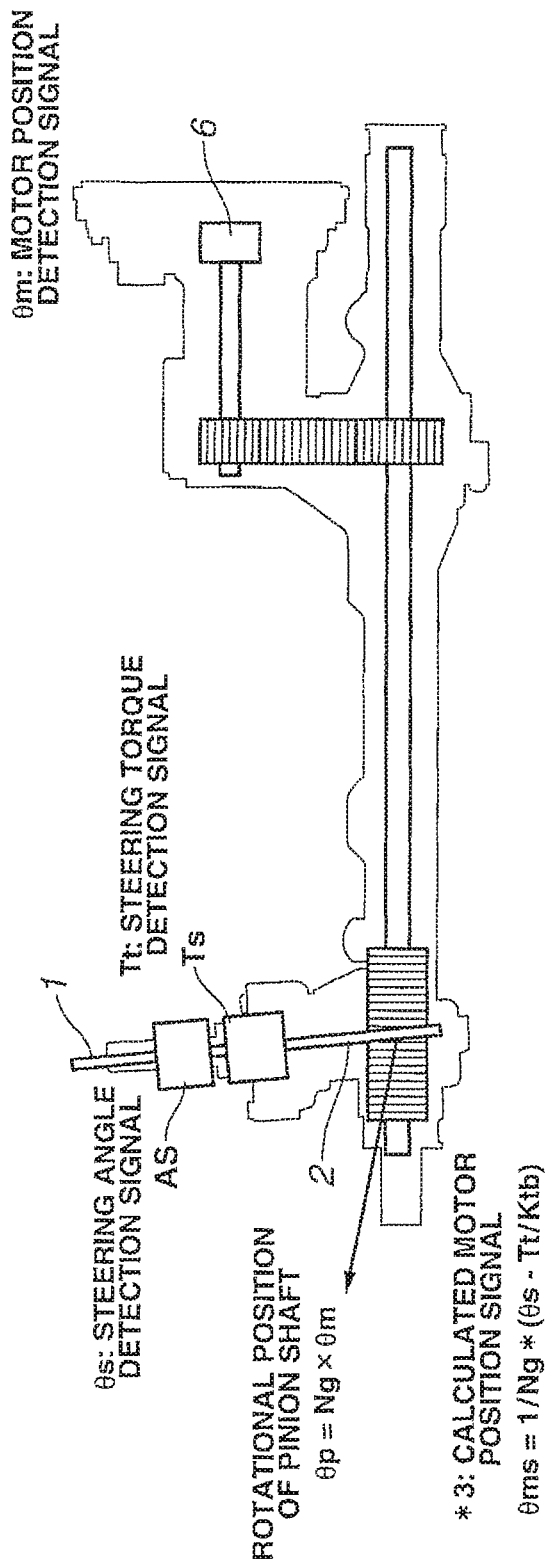
FIG. 12 is a schematic view showing an example of calculation of an operational motor position signal (as an alternative signal) in the power steering device according to the third embodiment of the present invention.

The power steering device according to the third embodiment will be explained below with reference to FIGS. 10 to 12. FIG. 10 is a flowchart of an abnormal signal switching process. FIG. 11 is a control block diagram for detection of the abnormality in the motor position detection signal. FIG. 12 is a schematic view showing an example of calculation of an operational motor position signal.

As shown in FIG. 10, the processing of steps S6 and S8 to S11 of the third embodiment is the same as that of the first embodiment. Hence, explanation of the same processing of the third embodiment as that of the first embodiment will be omitted herefrom; and the following explanation will be focused only on the difference of the third embodiment from the first embodiment.

At steps S1c to S3c, the motor position detection signals θm(Main) and θm(Sub), the steering angle detection signals θs(Main) and θs(Sub) and the steering torque detection signals Tt(Main) and Tt(Sub) are retrieved.

In the third embodiment, the alternative signal is calculated as an alternative to the detection signal of the motor position sensor 61, 62. More specifically, calculated motor position signals (alternative signal) θms(Main) and θms (Sub) are obtained by first and second motor position calculation circuits 16e and 16f of the alternative signal calculation section 20; and the calculated motor position signal θms(Main) is outputted as the alternative signal by the alternative signal determination circuit 18.

At step S4c, the calculated motor position signal (alternative signal) θms(Main) is obtained by the first motor position calculation circuit 16e based on the steering torque detection signal Tt(Main), the steering angle detection signal θs(Main), the torsional rigidity Ktb of the torsion bar and the reduction ratio Ng between the pinion shaft 2 and the motor shaft.

A method of calculation of the calculated motor position signal (alternative signal) θms(Main) will be explained below with reference to FIG. 12.

The steering torque detection signal Tt(Main) is divided by the torsional rigidity Ktb of the torsion bar. The resulting division value Tt/Ktb is subtracted from the steering angle detection signal θs(Main). The resulting subtraction value is multiplied by the reduction ratio Ng between the pillion shaft 2 and the motor shaft. The calculated motor position signal (alternative signal) θms(Main) is obtained by dividing 1 by the resulting multiplication value Ng×(θs−T/Ktb). Namely, the calculated motor position signal (alternative signal) θms is given by the following equation (3).

$$\theta ms = 1/Ng \times (\theta s - T/Ktb) \quad (3)$$

In the case where the steering angle sensor AS is located on the steerable wheel side with respect to the torsion bar, the steering angle detection signal θs is equal to the rotational angle θp of the pillion shaft 2. There is no need to consider the value Tt/Ktb.

Next, the calculated motor position signal (alternative signal) θms(Sub) is obtained by the second motor position calculation circuit 16f based on the steering torque detection signal Tt(Sub), the steering angle detection signal θs(Sub), the torsional rigidity Ktb of the torsion bar and the reduction ratio Ng between the pinion shaft 2 and the motor shaft.

A method of calculation of the calculated motor position signal (alternative signal) θms(Sub) is similar to that of the calculated motor position signal (alternative signal) θms (Main).

At step S5c, it is judged by an abnormality detection section 17c whether the difference |θm(Main)−θm(Sub)| between the two motor position detection signals is smaller than an abnormality detection threshold value. When the difference |θm(Main)−θm(Sub)| between the two motor position detection signals is judged as being smaller than the abnormality detection threshold value, the process goes to step S6. At step S6, the abnormality counter is cleared by the abnormality detection section. At step 7c, the motor position detection signal θm(Main) is set as the signal for steering assist control by the switching judgment section 19. After that, the process ends the current control cycle.

As explained above, it is possible according to the third embodiment to obtain the same effects as according to the first and second embodiments.

[Fourth Embodiment]

The fourth embodiment is characterized by the execution of steering assist control based on the alternative signal during a time period from detection of the abnormality to determination of the occurrence of the abnormality.

Figure 13:
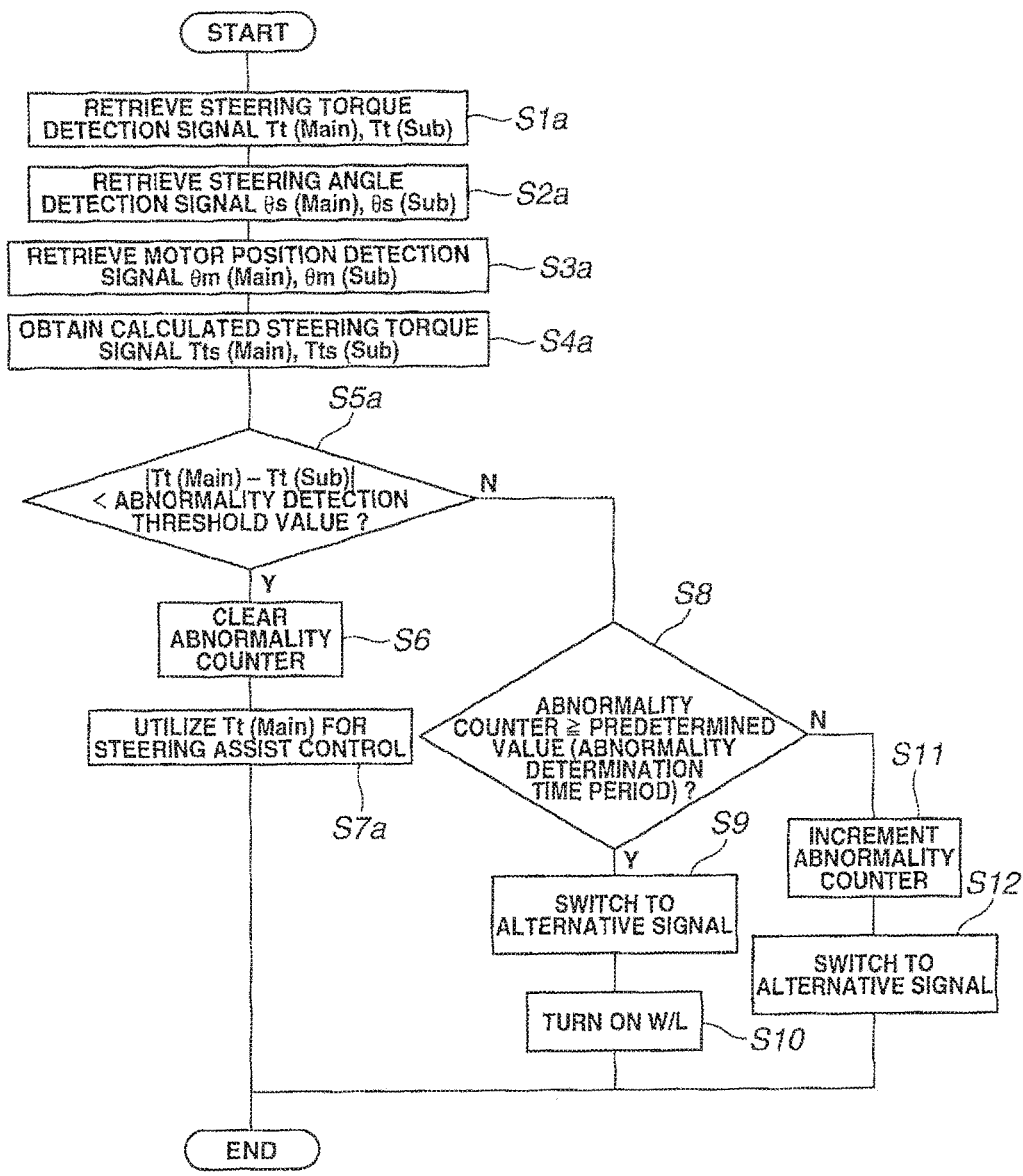
FIG. 13 is a flowchart of an abnormal signal switching process of a power steering device according to a fourth embodiment of the present invention.

The power steering device according to the fourth embodiment will be explained below with reference to FIG. 13. FIG. 13 is a flowchart of an abnormal signal switching process.

As shown in FIG. 13, the processing of steps S1a to S11 of the fourth embodiment is the same as that of the first embodiment. Hence, explanation of the same processing of the fourth embodiment as that of the first embodiment will be omitted herefrom; and the following explanation will be focused only on the difference of the fourth embodiment from the first embodiment.

In the fourth embodiment, the abnormality counter is incremented at step S11 when the abnormality counter is judged at step S8 as being smaller than the predetermined value. At step S12, the first calculated steering torque signal (alternative signal) Tts(Main) or the second calculated steering torque signal Tts(Sub) is selected and set the signal for steering assist control.

In the subsequent control cycle, the abnormality counter is cleared at step S6 when the difference |Tt(Main)−Tt(Sub)| between the two steering torque detection signals is judged at step S5a as being smaller the abnormality detection threshold value. At step S7a, the control unit is switched back to normal assist control based on the steering torque detection signal Tt(Main).

Although the control unit is configured to detect the abnormality in the steering torque detection signal Tt(Main), Tt(Sub) and generate the alternative signal in the fourth embodiment, it is alternatively feasible to detect an abnormality in the steering angle detection signal θs(Main), θs(Sub) or the motor position detection signal θm(Main), θm(Sub) and generate an alternative signal in the same manner as in the fourth embodiment.

As explained above, it is possible according to the fourth embodiment to obtain the same effects as according to the first embodiment. It is also possible to ensure steering safety at an early stage by switching over the signal for steering assist control to the alternative signal before determining the occurrence of the abnormality.

It is further possible to perform more appropriate steering control operation by, when the sensor signal returns to the normal state, switching back to normal assist control.

In the fourth embodiment, the abnormality detection section 17a counts the time for lapse of the predetermined time period and resets the time count when the condition of detection of the abnormality by the abnormality detection section 17 is judged as being resolved so that, even in the case where the sensor signal once returns to the normal state but goes back to the abnormality state, the abnormality detection section can recount the time for lapse of the predetermined time period. It is thus possible to improve the accuracy of judgement of the abnormality state.

[Fifth Embodiment]

The fifth embodiment is characterized by the execution of steering assist control based on an average signal during a time period from detection of the abnormality to determination of the occurrence of the abnormality.

Figure 14:
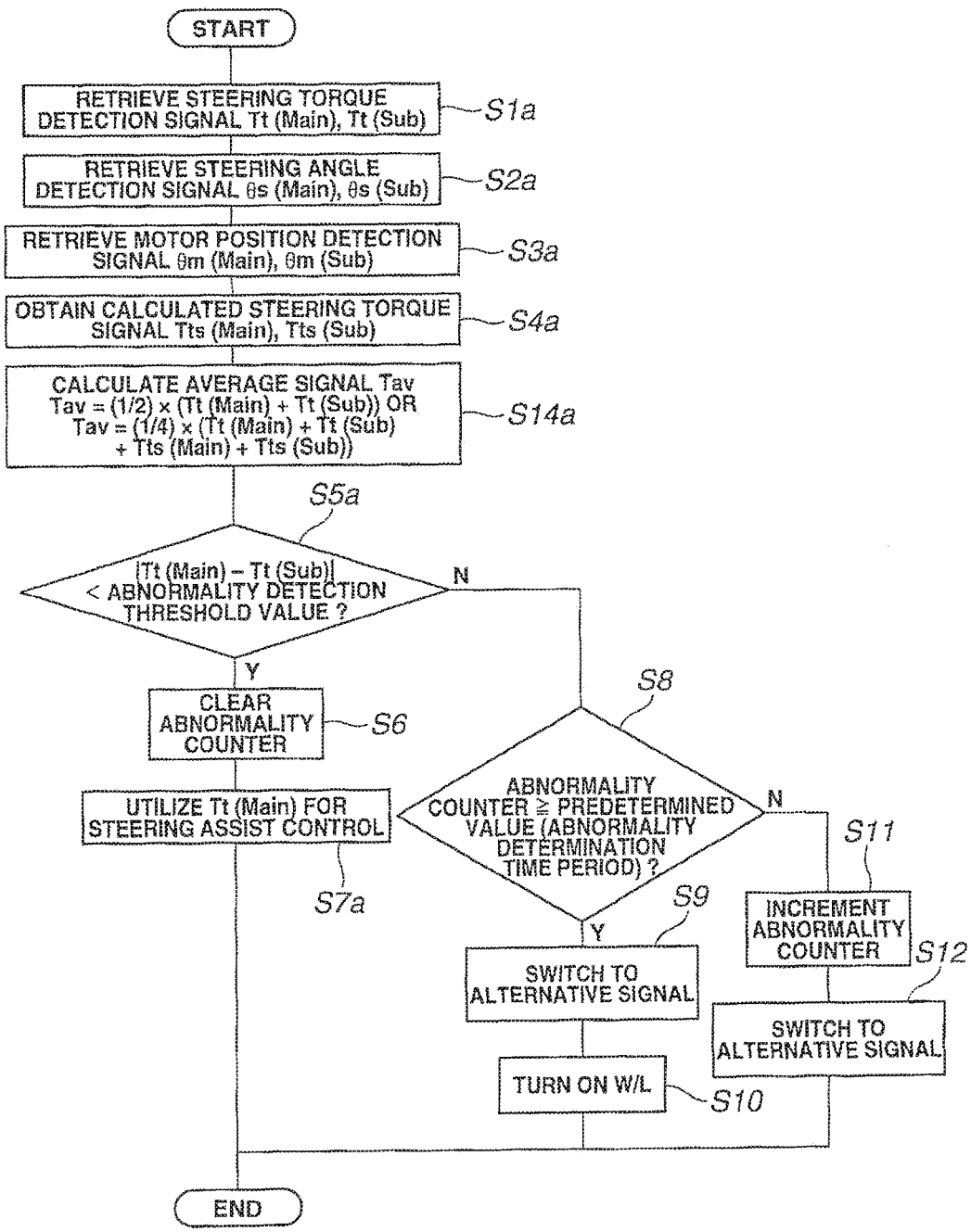
FIG. 14 is a flowchart of an abnormal signal switching process of a power steering device according to a fifth embodiment of the present invention.
Figure 15:
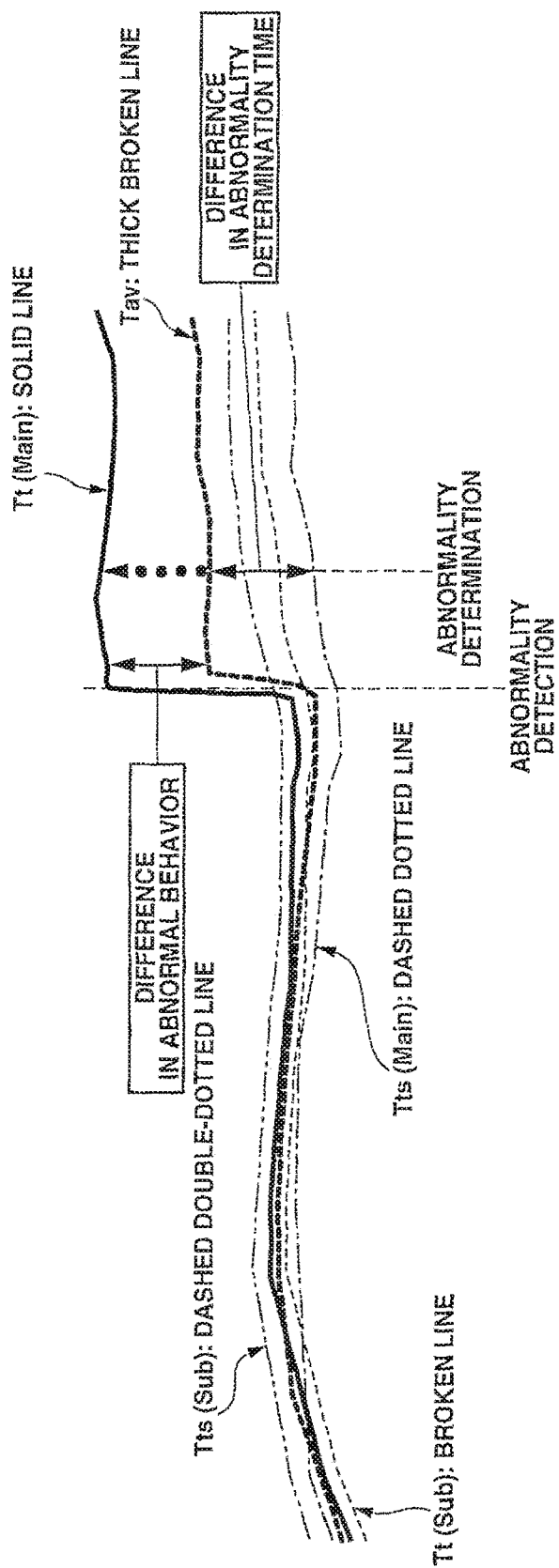
FIG. 15 is a time chart of an average signal generated in the power steering device according to the fifth embodiment of the present invention.

The power steering device according to the fifth embodiment will be explained below with reference to FIGS. 14 and 15. FIG. 14 is a flowchart of an abnormal signal switching process. FIG. 15 is a time chart of the average signal.

As shown in FIG. 14, the processing of steps S1a to S11 of the fifth embodiment is the same as that of the fourth embodiment. Hence, explanation of the same processing of the fifth embodiment as that of the fourth embodiment will be omitted herefrom; and the following explanation will be focused only on the difference of the fifth embodiment from the fourth embodiment.

After step S4a, the average signal Tav is calculated at step S14. In the fifth embodiment, the average signal Tav is calculated as an average value of the steering torque detection signals according to the following equation: Tav=½×(Tt(Main)+Tt(Sub)) or calculated as an average value of the steering torque detection signals and the calculated steering torque signals according to the following equation: Tav=¼×(Tt(Main)+Tt(Sub)+Tts(Main)+Tts(Sub)).

When the abnormality counter is judged at step S8 as being smaller than the predetermined value, the abnormality counter is incremented at step S11. At step S14, the average signal Tav is selected and set as the signal for steering assist control.

Although the control unit is configured to detect the abnormality in the steering torque detection signal Tt(Main), Tt(Sub) and generate the average signal Tav in the fifth embodiment, it is alternatively feasible to detect an abnormality in the steering angle detection signal θs(Main), θs(Sub) or the motor position detection signal θm(Main), θm(Sub) and generate an average signal Tav in the same manner as in the fifth embodiment.

It is possible according to the fifth embodiment to, even when there occurs a large change in one signal value in the occurrence of the abnormality, ease such a change by averaging a larger number of signals as explained above. More specifically, the control unit is configured to, when the abnormality occurs in the steering torque detection signal Tt(Main), switch over to the average signal Tav, rather than, use the abnormal steering torque detection signal Tt(Main) as it is, for steering assist control until determination of the occurrence of the abnormality. It is possible by this switching process to reduce a change in system behavior until the determination of the occurrence of the abnormality or at the switchover to the calculated steering torque signal (alternative signal) Tts(Main), Tts(Sub) after determination of the abnormality and thereby possible to reduce handle shock at the switchover.

Since the average signal calculated using the steering torque detection signals Tt(Main) and Tt(Sub) shows a value close to the actual steering status, it is possible to perform more appropriate steering control operation by properly using this average signal than by using only the calculated steering torque signal Tts(Main), Tts(Sub) as the alternative signal. Even though the steering torque detection signal Tt(Main), Tt(Sub) may contain an abnormality, it is possible to smoothen the abnormal signal and suppress the influences of the abnormal signal by averaging the signals.

It is alternatively feasible to switch over the signal for steering assist control to the average signal Tav at step 9 although the signal for steering assist control is switched over to the calculated steering torque signal (alternative signal) Tts(Main) at step S9 after determination of the abnormality in the fifth embodiment.

[Sixth Embodiment]

The sixth embodiment is characterized by the application of limit processing on the maximum motor torque during the execution of steering assist control based on the alternative signal upon determining the occurrence of the abnormality.

Figure 16:
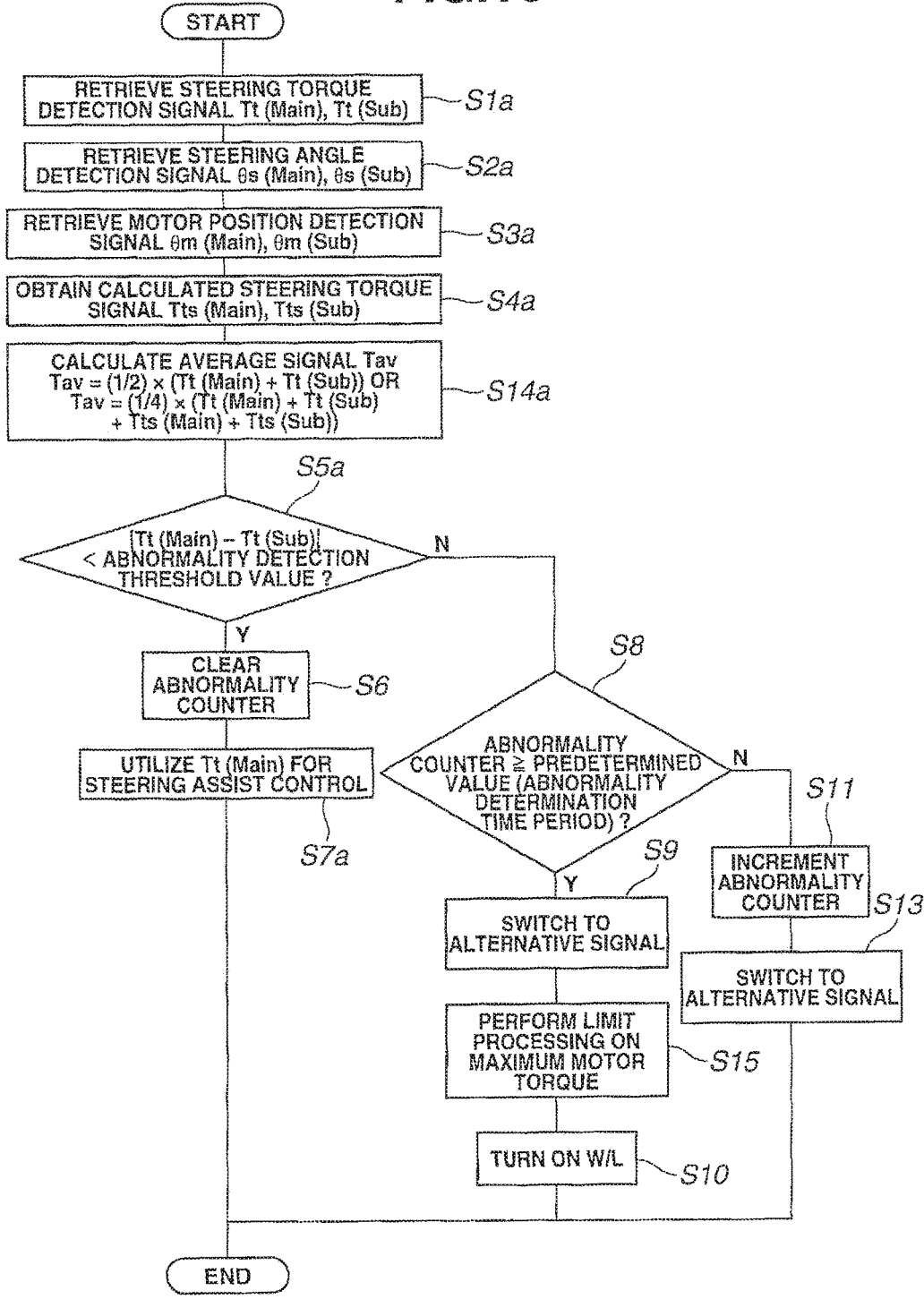
FIG. 16 is a flowchart of an abnormal signal switching process of a power steering device according to a sixth embodiment of the present invention.
Figure 17:
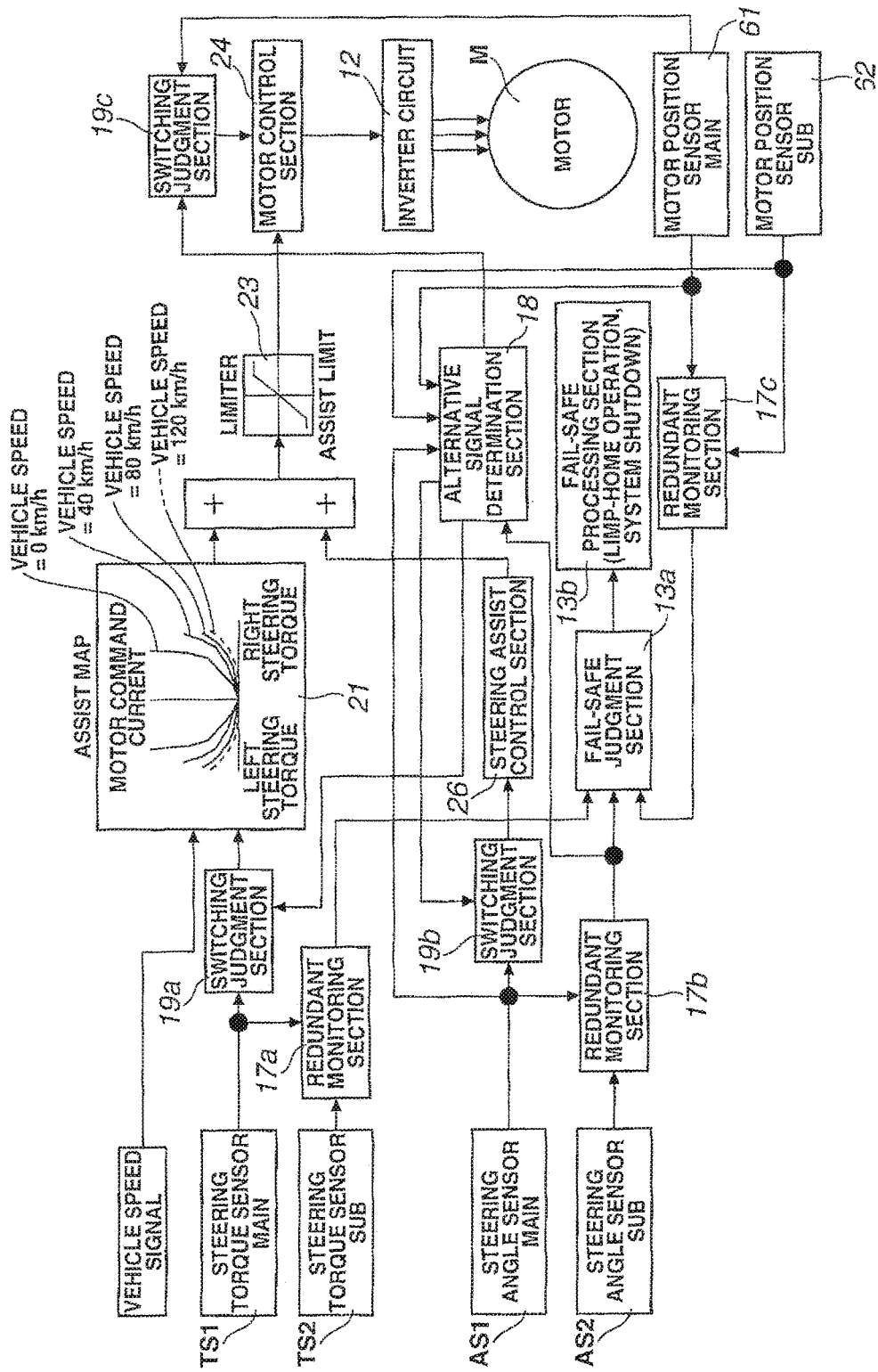
FIG. 17 is a control block diagram for the abnormal signal switching process of the power steering device according to the sixth or seventh embodiment of the present invention.
Figure 18:
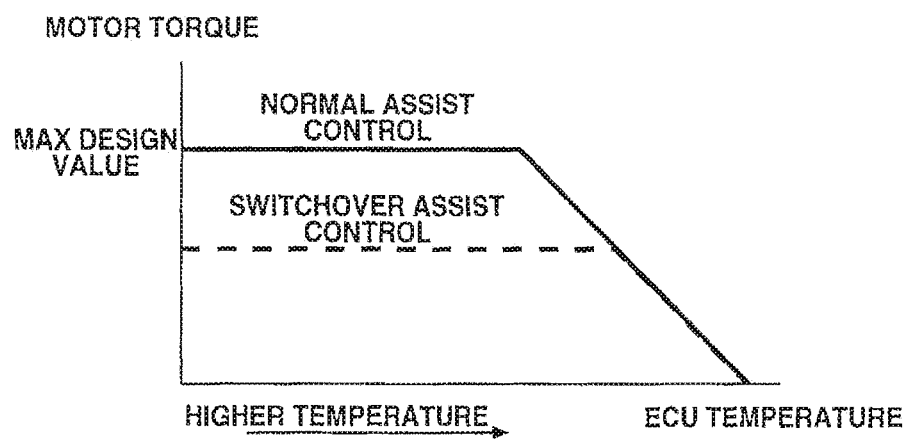
FIG. 18 is a graph showing one example of steering assist limit processing in the power steering device according to the sixth embodiment of the present invention.
Figure 19:
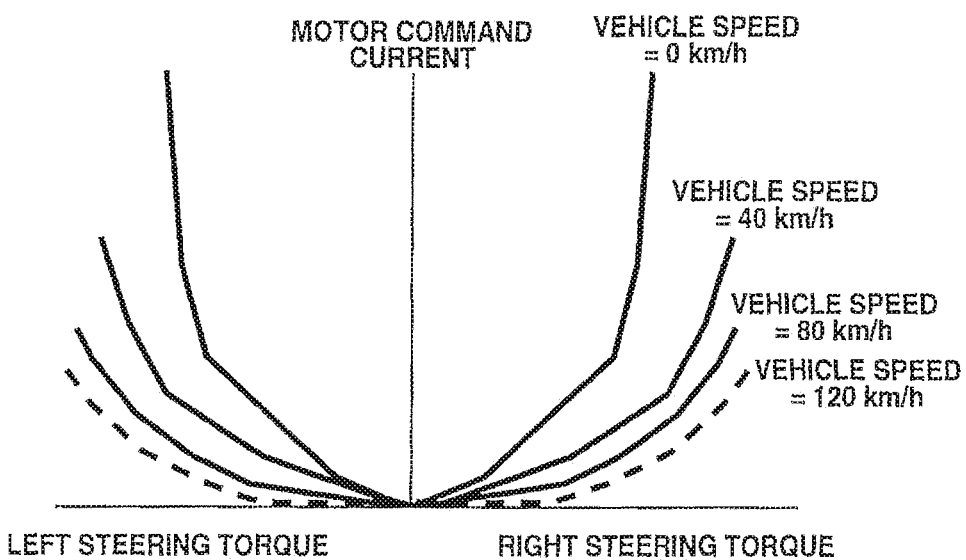
FIG. 19 is a graph showing another example of steering assist limit processing in the power steering device according to the sixth embodiment of the present invention.

The power steering device according to the sixth embodiment will be explained below with reference to FIGS. 16 to 19. FIG. 16 is a flowchart of an abnormal signal switching process. FIG. 17 is a control block diagram for detection of the abnormality. FIG. 18 is a schematic view showing one example of steering assist limit processing. FIG. 19 is a schematic view showing another example of steering assist limit processing.

As shown in FIG. 16, the processing of steps S1a to S13 and S14 of the sixth embodiment is the same as that of the fifth embodiment. Hence, explanation of the same processing of the sixth embodiment as that of the fifth embodiment will be omitted herefrom; and the following explanation will be focused only on the difference of the sixth embodiment from the fifth embodiment.

Herein, a steering assist control section 26 is arranged to perform handle return control. Explanation of the steering assist control section 26 will be omitted herefrom because this section is not directly relevant to the present invention. Further, abnormality detection sections 17b and 17c and switching judgment sections 19b and 19c are not directly relevant to the sixth embodiment. Explanation of these sections 17b, 17c, 19b and 19c will be omitted herefrom and will be given in the following seventh embodiment.

When the occurrence of the abnormality is determined at step S8 by judging that the abnormality counter exceeds the predetermined value, the alternative signal is selected and set as the signal for steering assist control by a switching judgment section 19a at step S9 so that the motor command current is determined based on the alternative signal with reference to an assist map 21 in accordance with the vehicle speed. At step S15, limit processing is performed on the maximum torque of the electric motor M by a limiter 23. Then, the motor command signal (voltage command signal, current command signal or the like) is outputted by a motor control section 24 based on the output of the limiter 23 so that electric motor M is driven via the inverter circuit 12 according to the motor command signal.

As indicated by a solid line in FIG. 18, the maximum motor torque is limited to its maximum design value during normal steering assist control. During the continuation of steering assist control by the switchover to the alternative signal, the maximum motor torque is limited by the limiter 23 to a value smaller than the maximum design value as indicated by a broken line in FIG. 18.

It is possible according to the sixth embodiment to ensure steering safety by, when the occurrence of the abnormality is determined, performing assist limit processing as explained above.

As the steering assist force is lowered by the execution of assist limit processing, the steering force becomes heavier. This makes it easy for the vehicle driver to recognize the occurrence of the abnormality.

In the assist map 21, the motor command current is normally set according to the steering torque at the respective vehicle speed as shown in FIG. 19. As shown in FIG. 19, the motor command current is set larger when the vehicle speed is 0 km/h and becomes smaller as the vehicle speed is increased to 40 km/h, to 80 km/h and then to 120 km/h. Although the limiter 23 is utilized to perform limit processing on the maximum torque of the electric motor M during the continuation of steering assist control by the switchover to the alternative signal upon determination of the abnormality in the sixth embodiment, it is alternatively feasible to perform steering assist limit processing by fixing the motor current command to a value corresponding to vehicle speed=120 km/h as indicated by a broken line in FIG. 19.

[Seventh Embodiment]

The seventh embodiment is characterized by the application of redundant comparison between the steering angle detection signals θs(Main) and θs(Sub) and the motor position detection signals θm(Main) and θm(Sub) used for the generation of the alternative signal.

The power steering device according to the seventh embodiment will be explained below with reference to FIGS. 20 and 17. FIG. 20 is a flowchart of an abnormal signal switching process. FIG. 17 is a control block diagram for detection of the abnormality.

As shown in FIG. 20, the processing of steps S1a to S13 and S14 of the seventh embodiment is the same as that of the sixth embodiment. Hence, explanation of the same processing of the seventh embodiment as that of the sixth embodiment will be omitted herefrom; and the following explanation will be focused only on the difference of the seventh embodiment from the sixth embodiment.

When the occurrence of the abnormality is determined at step S8, the alternative signal is selected and set as the signal for steering assist control by the switching judgment section 19a at step S9. At step S15, it is judged by the abnormality detection section 17b whether the difference |θs(Main)−θs(Sub)| between the steering angle detection signals is smaller than an abnormality detection threshold value.

When the difference |θs(Main)−θs(Sub)| between the steering angle detection signals is judged as being greater than or equal to the abnormality detection threshold value, the process goes to step S16. At step S16, it is judged by the abnormality detection section 17b whether the steering angle abnormality counter is greater than or equal to a predetermined value.

When the steering angle abnormality counter is judged as being greater than or equal to the predetermined value, the process goes to step S17. At step S17, the steering assist control is interrupted by a fail-safe judgment section 13a and a fail-safe processing section 16b. At step S18, the warning lamp is turned on so as to give a warning to the vehicle driver.

When the steering angle abnormality counter is judged as being smaller than the predetermined value, the process goes to step S19. At step S19, the steering angle abnormality counter is incremented. At step S20, the warning lamp is turned on so as to give a warning to the vehicle driver.

When the difference |θs(Main)−θs(Sub)| between the steering angle detection signals is judged at step S15 as being smaller than the abnormality detection threshold value, the process goes to step S21. At step S21, it is judged by the abnormality detection section 17c whether the difference |θm(Main)−θm(Sub)| between the motor position detection signals is smaller than an abnormality detection threshold value. When the difference |θm(Main)−θm(Sub)| between the motor position detection signals is judged as being greater than or equal to the abnormality detection threshold value, the process goes to step S22. At step 22, it is judged by the abnormality detection section 17c whether the motor position abnormality counter is greater than or equal to a predetermined value.

When the motor position abnormality counter is judged at step S22 as being greater than or equal to the predetermined value, the process goes to step S23. At step S23, the steering assist control is interrupted. At step S24, the warning lamp is turned on so as to give a warning to the vehicle driver.

When the motor position abnormality counter is judged at step S22 as being smaller than the predetermined value, the process goes to step S25. At step S25, the motor position abnormality counter is incremented. At step S26, the warning lamp is turned on so as to give a warning to the vehicle driver.

When the difference |θm(Main)−θm(Sub)| between the motor position detection signals is judged at step S21 as being smaller than the abnormality detection threshold value, the process goes to step S27. At step S27, the steering angle abnormality counter and the motor position abnormality counter are cleared. In this case, however, the steering assist control is being executed according to the alternative signal as the occurrence of the abnormality in the steering torque detection signal Tt(Main) or Tt(Sub) is determined. The warning lamp is thus turned on at step S10 so as to give a warning to the vehicle driver.

As explained above, it is possible to perform redundant monitoring on all of the sensor units and attain safety improvement by double failure detection.

[Eighth Embodiment]

The eighth embodiment is characterized by the application of gradual decrease of the steering assist force upon determining the occurrence of the abnormality in the steering torque detection signal Tt(Main) or Tt(Sub).

The power steering device according to the eighth embodiment will be explained below with reference to FIG. 21. FIG. 21 is a flowchart of an abnormal signal switching process.

As shown in FIG. 21, the processing of steps S1a to S13 and S14 of the eighth embodiment is the same as that of the sixth embodiment. Hence, explanation of the same processing of the eighth embodiment as that of the sixth embodiment will be omitted herefrom; and the following explanation will be focused only on the difference of the eighth embodiment from the sixth embodiment.

When the occurrence of the abnormality is determined at step S8 by judging that the abnormality counter exceeds the predetermined value, the alternative signal is selected and set as the signal for steering assist control at step S9. At step S10, the warning lamp is turned on. At step S28, it is judged whether the gradual decrease counter is greater than or equal to a predetermined value.

When the gradual decrease counter is judged as being smaller than the predetermined value, the process goes to step S29. At step S29, gradual decrease of the motor torque is caused. At step S30, the gradual decrease counter is incremented. When the gradual decrease counter reaches the predetermined value, the motor torque is set to zero, or the steering assist control is interrupted, at step S31.

When the difference |Tt(Main)−Tt(Sub)| between the steering torque detection signals is judged at step S5a as being smaller than the abnormality detection threshold value, the process goes to step S6. At step S6, the abnormality counter is cleared. Further, the gradual decrease counter is cleared at step S32. The subsequent processing is the same as that of the sixth embodiment.

As explained above, the control unit is configured to gradually decrease the steering assist control after the expiration of a predetermined time from turn-on of the warning lamp upon detection of the abnormality in the steering torque detection signal Tt(Main), Tt(Sub) in the eighth embodiment. It is possible by this control process to move the vehicle to a safe place before completely stopping the steering assist control. It is also possible to suppress continuous driving by the driver and attain safety improvement by gradually decreasing the steering assist amount with the passage of time. It is further possible to suppress uncomfortable steering feeling by gradually setting output limit.

Although the present invention has been described with reference to the above specific embodiments, it is apparent to those skilled in the art that: various modifications and variations of the embodiments are made within the technical spirit of the present invention; and such modifications and variations belong to the scope of the present invention.

For example, the motor control section may output the motor command signal for drive control of the electric motor based on the alternative signal when the ignition switch of the vehicle is once turned off after detection of the abnormality by the abnormality detection section, and then, turned on. In this case, it is possible to reduce the steering load of the vehicle driver by continuing steering control operation based on the alternative signal at a restart of the vehicle.

Hereinafter, technical ideas comprehended from the above embodiments but not described in the following claims as well as effects thereof will be explained below.

(a) The power steering device according to claim 2, wherein the motor control section outputs the motor command signal for drive control of the electric motor based on the alternative signal when an ignition switch of a vehicle is once turned off after detection of the abnormality by the abnormality detection section, and then, turned on.

It is possible according to technical idea (a) to reduce a steering load of a vehicle driver by continuing steering control operation based on the alternative signal even at a restart of the vehicle.

(b) The power steering device according to claim 4, wherein the motor control section outputs the motor command signal based on the compared signal when the abnormality detection section judges that a condition of detection of the abnormality is resolved after the motor control section outputs the motor command signal based on the alternative signal upon detection of the abnormality by the abnormality detection section.

It is possible according to technical idea (b) to perform more appropriate steering control operation by, when the sensor signal returns to the normal state, switching back to normal control (i.e. control based on the compared signal).

(c) The power steering device according to technical idea (b), wherein the abnormality detection section makes a time count for lapse of the predetermined time period and, upon judging that the condition of detection of the abnormality is resolved before the lapse of the predetermined time period, resets the time count.

It is possible according to technical idea (c) to, even in the case where the sensor signal once returns to the normal state but goes back to the abnormality state, restart the time count for lapse of the predetermined time period and thereby possible to attain improvement in abnormality judgment accuracy.

(d) The power steering device according to claim 8, wherein, when the abnormality detection section detects the abnormality, the motor control section outputs the motor command signal such that the motor command signal gradually decreases.

It is possible according to technical idea (d) to suppress uncomfortable steering feeling by gradually setting output limit.

(e) The control unit of the power steering device according to claim 10, wherein the abnormality detection section performs all of the first comparison, the second comparison and the third comparison and detects the abnormality in the torque sensor, the steering angle sensor and the motor position sensor.

It is possible according to technical idea (e) to attain safety improvement by performing redundant monitoring on all of the sensors.

(f) The control unit of the power steering device according to technical idea (e), wherein the motor control section outputs the motor command signal for drive control of the electric motor based on the alternative signal when an ignition switch of a vehicle is once turned off after detection of the abnormality by the abnormality detection section, and then, turned on.

It is possible according to technical idea (f) to reduce a steering load of a vehicle driver by continuing steering control operation based on the alternative signal even at a restart of the vehicle.

(g) The control unit of the power steering device according to claim 10, wherein the abnormality detection section detects the abnormality and determines occurrence of the abnormality as determined information when a condition of detection of the abnormality continues for a predetermined time period; and wherein the motor control section outputs the motor command signal based on the alternative signal before the abnormality detection section detects and determines the occurrence of the abnormality as the determined information.

It is possible according to technical idea (g) to ensure steering safety at an early stage by switching over to the alternative signal before determining the occurrence of the abnormality.

(h) The control unit of the power steering device according to technical idea (g), wherein the motor control section outputs the motor command signal based on the compared signal when the abnormality detection section judges that the condition of detection of the abnormality is resolved after the motor control section outputs the motor command signal based on the alternative signal upon detection of the abnormality by the abnormality detection section.

It is possible according to technical idea (h) to perform more appropriate steering control operation by, when the sensor signal returns to the normal state, switching back to normal control (i.e. control based on the compared signal).

(i) The control unit of the power steering device according to technical idea (h), wherein the abnormality detection section makes a time count for lapse of the predetermined time period and, upon judging that the condition of detection of the abnormality is resolved before the lapse of the predetermined time period, resets the time count.

It is possible according to technical idea (i) to, even in the case where the sensor signal once returns to the normal state but goes back to the abnormality state, restart the time count for lapse of the predetermined time period and thereby possible to attain improvement in abnormality judgment accuracy.

(j) The control unit of the power steering device according to claim 10, wherein the alternative signal is an average of the compared signal and the compared signal equivalent value calculated based on any of the detection signals other than the compared signal.

It is possible according to technical idea (j) to perform more appropriate steering control operation by properly using the average value than by using only the compared signal equivalent value as the alternative signal because the average signal contains in which the compared signal itself is contained shows a value close to the actual steering status. Even though the compared signal may contain an abnormality, it is possible to smoothen the abnormal signal and suppress the influences of the abnormal signal by using the average value.

(k) The control unit of the power steering device according to claim 10, wherein the motor control section outputs the motor command signal such that the motor command signal is smaller when the abnormality detection section detects the abnormality than in the normal state.

It is possible according to technical idea (k) to attain safety improvement by setting output limit under the condition of detection of the abnormality.

(l) The control unit of the power steering device according to technical idea (k), wherein, when the abnormality detection section detects the abnormality, the motor control section outputs the motor command signal such that the motor command signal gradually decreases.

It is possible according to technical idea (l) to suppress uncomfortable steering feeling by gradually setting output limit.

The invention claimed is:

1. A power steering device comprising:
    a steering system configured to steer steerable wheels in response to a steering operation of a steering wheel;
    an electric motor configured to apply a steering force to the steering system;
    an ECU configured to perform drive control of the electric motor;
    a torque sensor arranged on the steering system to detect a steering torque generated in the steering system;
    a steering angle sensor arranged on the steering system to detect a steering angle as a steering amount of the steering wheel; and
    a motor position sensor arranged on the electric motor to detect a rotor rotational position of the electric motor,
    the ECU comprising:
        torque signal receivers configured to receive first and second steering torque detection signals from the torque sensor, said first and second steering torque detection signals being detected by and outputted from different detection elements of the torque sensor or being detected by a common detection element of the torque sensor and outputted through different electronic circuits;
        steering angle signal receivers configured to receive first and second steering angle detection signals from the steering angle sensor, said first and second steering angle detection signals being detected by and outputted from different detection elements of the steering angle sensor or being detected by a common detection element of the steering angle sensor and outputted through different electronic circuits;
        motor position signal receivers configured to receive first and second motor position detection signals from the motor position sensor, said first and second motor position detection signals being detected by and outputted from different detection elements of the motor position sensor or being detected by a common detection element of the motor position sensor and outputted through different electronic circuits;
        an abnormal detection section configured to detect an abnormality in the torque sensor, the steering angle sensor or the motor position sensor by performing at least one of (1) a first comparison between the first and second steering torque detection signals, (2) a second comparison between the first and second steering angle detection signals, or (3) a third comparison between the first and second motor position detection signals, wherein the first comparison is associated with a first detection signal, the second comparison is associated with a second detection signal, and the third comparison is associated with a third detection signal;

an alternative signal calculation section configured to
set, as a comparison signal, the respective detection signal associated with detecting the abnormality by performing one of the first comparison, the second comparison, or the third comparison, such that the first detection signal is set as the comparison signal when the first comparison is performed, the second detection signal is set as the comparison signal when the second comparison is performed, and the third detection signal is set as the comparison signal when the third comparison is performed; and calculate an alternative signal by using (1) a detection signal other than the detection signal set as the comparison signal, or (2) the comparison signal and a detection signal other than the detection signal set as the comparison signal, wherein a value indicated by the alternative signal and a value indicated by the comparison signal share a common parameter; and a motor control section configured to
output a motor command signal to control driving of the electric motor based on the comparison signal in a normal state where the abnormality detection section detects no abnormality in the torque sensor, the steering angle sensor and the motor position sensor; and when the abnormality detection section detects the abnormality in the torque sensor, the steering angle sensor or the motor position sensor, output a motor command signal to control driving of the electric motor based on the alternative signal, wherein when the abnormality detection section detects the abnormality and a condition of detection of the abnormality continues for a predetermined time period, the abnormality detection section determines occurrence of the abnormality as determined information, and the motor control section is configured to output the motor command signal based on the alternative signal before the abnormality detection section determines the occurrence of the abnormality as the determined information.

2. The power steering device according to claim 1,
wherein the abnormality detection section is configured to perform all of the first comparison, the second comparison and the third comparison and to detect the abnormality in the torque sensor, the steering angle sensor and the motor position sensor.

3. The power steering device according to claim 2,
wherein the motor control section is configured to output the motor command signal to control driving of the electric motor based on the alternative signal when an ignition switch of a vehicle is once turned off after detection of the abnormality by the abnormality detection section, and is then turned on.

4. The power steering device according to claim 1,
wherein the motor control section is configured to output the motor command signal based on the compared signal when the abnormality detection section judges that the condition of detection of the abnormality is resolved after the motor control section outputs the motor command signal based on the alternative signal upon detection of the abnormality by the abnormality detection section.

5. The power steering device according to claim 4,
wherein the abnormality detection section is configured to make a time count for a lapse of the predetermined time period and, upon judging that the condition of detection of the abnormality is resolved before the lapse of the predetermined time period, reset the time count.

6. The power steering device according to claim 1,
wherein the alternative signal is an average value of (1) the comparison signal and (2) the detection signal other than the detection signal that is set as the comparison signal.

7. The power steering device according to claim 1,
wherein the motor control section is configured to output the motor command signal such that the motor command signal is smaller when the abnormality detection section detects the abnormality than in the normal state.

8. The power steering device according to claim 7,
wherein, when the abnormality detection section detects the abnormality, the motor control section outputs the motor command signal such that the motor command signal gradually decreases.

9. A control unit of a power steering device, the power steering device comprising a steering system configured to steer steerable wheels in response to a steering operation of a steering wheel; an electric motor configured to apply a steering force to the steering system; a torque sensor arranged to detect a steering torque generated in the steering system; a steering angle sensor arranged to detect a steering angle as a steering amount of the steering wheel; and a motor position sensor arranged to detect a rotor rotational position of the electric motor, the control unit comprising:

torque signal receivers configured to receive first and second steering torque detection signals from the torque sensor, said first and second steering torque detection signals being detected by and outputted from different detection elements of the torque sensor or being detected by a common detection element of the torque sensor and outputted through different electronic circuits;

steering angle signal receivers configured to receive first and second steering angle detection signals from the steering angle sensor, said first and second steering angle detection signals being detected by and outputted from different detection elements of the steering angle sensor or being detected by a common detection element of the steering angle sensor and outputted through different electronic circuits;

motor position signal receivers configured to receive first and second motor position detection signals from the motor position sensor, said first and second motor position detection signals being detected by and outputted from different detection elements of the motor position sensor or being detected by a common detection element of the motor position sensor and outputted through different electronic circuits;

an abnormal detection section configured to detect an abnormality in the torque sensor, the steering angle sensor or the motor position sensor by performing at least one of (1) a first comparison between the first and second steering torque detection signals, (2) a second comparison between the first and second steering angle detection signals, or (3) a third comparison between the first and second motor position detection signals, wherein the first comparison is associated with a first detection signal, the second comparison is associated with a second detection signal, and the third comparison is associated with a third detection signal;

an alternative signal calculation section configured to
  set, as a comparison signal, the respective detection signal associated with detecting the abnormality by performing one of the first comparison, the second comparison, or the third comparison, such that the first detection signal is set as the comparison signal when the first comparison is performed, the second detection signal is set as the comparison signal when the second comparison is performed, and the third detection signal is set as the comparison signal when the third comparison is performed, and
  calculate an alternative signal by using (1) a detection signal other than the detection signal set as the comparison signal, or (2) the comparison signal and a detection signal other than the detection signal set as the comparison signal, wherein a value indicated by the alternative signal and a value indicated by the comparison signal share a common parameter; and
a motor control section configured to
  output a motor command signal to control driving of the electric motor based on the comparison signal in a normal state where the abnormality detection section detects no abnormality in the torque sensor, the steering angle sensor and the motor position sensor, and
  when the abnormality detection section detects the abnormality in the torque sensor, the steering angle sensor or the motor position sensor, output a motor command signal to control driving of the electric motor based on the alternative signal,
wherein when the abnormality detection section detects the abnormality and a condition of detection of the abnormality continues for a predetermined time period, the abnormality detection section determines occurrence of the abnormality as determined information, and the motor control section is configured to output the motor command signal based on the alternative signal before the abnormality detection section detects and determines the occurrence of the abnormality as the determined information.

10. The control unit of the power steering device according to claim 9,
  wherein the abnormality detection section is configured to perform all of the first comparison, the second comparison and the third comparison and detect the abnormality in the torque sensor, the steering angle sensor and the motor position sensor.

11. The control unit of the power steering device according to claim 10,
  wherein the motor control section is configured to output the motor command signal to control driving of the electric motor based on the alternative signal when an ignition switch of a vehicle is once turned off after detection of the abnormality by the abnormality detection section, and is then turned on.

12. The control unit of the power steering device according to claim 9,
  wherein the motor control section is configured to output the motor command signal based on the comparison signal when the abnormality detection section judges that the condition of detection of the abnormality is resolved after the motor control section outputs the motor command signal based on the alternative signal upon detection of the abnormality by the abnormality detection section.

13. The control unit of the power steering device according to claim 12,
  wherein the abnormality detection section is configured to make a time count for a lapse of the predetermined time period and, upon judging that the condition of detection of the abnormality is resolved before the lapse of the predetermined time period, reset the time count.

14. The control unit of the power steering device according to claim 9,
  wherein the alternative signal is an average value of (1) the comparison signal and (2) the detection signal other than the detection signal that is set as the comparison signal.

15. The control unit of the power steering device according to claim 9,
  wherein the motor control section is configured to output the motor command signal such that the motor command signal is smaller when the abnormality detection section detects the abnormality than in the normal state.

16. The control unit of the power steering device according to claim 15,
  wherein, when the abnormality detection section detects the abnormality, the motor control section outputs the motor command signal such that the motor command signal gradually decreases.

17. A power steering device comprising:
  a steering system configured to control steering in response to a steering operation of a steering wheel;
  an electric motor configured to apply a steering force to the steering system;
  an ECU configured to control driving of the electric motor;
  a torque sensor provided with the steering system and configured to detect a steering torque generated in the steering system;
  a steering angle sensor provided with the steering system and configured to detect a steering angle as a steering amount of the steering wheel; and
  a motor position sensor provided with the electric motor and configured to detect a rotor rotational position of the electric motor,
  torque signal receivers configured to receive first and second steering torque detection signals from the torque sensor;
  steering angle signal receivers configured to receive first and second steering angle detection signals from the steering angle sensor;
  motor position signal receivers configured to receive first and second motor position detection signals from the motor position sensor; and
  an electronic control unit configured to
    detect an abnormality in the torque sensor, the steering angle sensor or the motor position sensor by performing at least one of (1) a first comparison between the first and second steering torque detection signals, (2) a second comparison between the first and second steering angle detection signals, or (3) a third comparison between the first and second motor position detection signals, wherein the first comparison is associated with a first detection signal, the second comparison is associated with a second detection signal, and the third comparison is associated with a third detection signal;
    set, as a comparison signal, the respective detection signal associated with detecting the abnormality by performing one of the first comparison, the second comparison, or the third comparison, such that the first detection signal is set as the comparison signal when the first comparison is performed, the second detection signal is set as the comparison signal when the second comparison is performed, and the third detection signal is set as the comparison signal when the third comparison is performed; and calculate an alternative signal by using (1) a detection signal other than the detection signal set as the comparison signal, or (2) the comparison signal and a detection signal other than the detection signal which is set as the comparison signal, wherein a value indicated by the alternative signal and a value indicated by the comparison signal share a common parameter;

when no abnormality is detected in the torque sensor, the steering angle sensor, or the motor position sensor, output a motor command signal to control driving of the electric motor based on the comparison signal;

when an abnormality is detected in the torque sensor, the steering angle sensor or the motor position sensor, output a motor command signal to control driving of the electric motor based on the alternative signal; and when the abnormality is detected and when a condition of detection of the abnormality continues for a predetermined time period, determine occurrence of the abnormality as determined information, and output the motor command signal based on the alternative signal before the occurrence of the abnormality is determined as the determined information.

* * * * *